United States Patent
Aron et al.

(10) Patent No.: US 11,074,135 B2
(45) Date of Patent: Jul. 27, 2021

(54) LARGE CONTENT FILE OPTIMIZATION

(71) Applicant: Cohesity, Inc., San Jose, CA (US)

(72) Inventors: Mohit Aron, Saratoga, CA (US);
Zhihuan Qiu, San Jose, CA (US);
Ganesha Shanmuganathan, San Jose, CA (US); Malini Mahalakshmi Venkatachari, Santa Clara, CA (US)

(73) Assignee: Cohesity, Inc., San Jose, CA (US)

( * ) Notice: Subject to any disclaimer, the term of this patent is extended or adjusted under 35 U.S.C. 154(b) by 0 days.

(21) Appl. No.: 16/688,653

(22) Filed: Nov. 19, 2019

(65) Prior Publication Data

US 2020/0125450 A1    Apr. 23, 2020

Related U.S. Application Data

(63) Continuation-in-part of application No. 16/024,107, filed on Jun. 29, 2018, now Pat. No. 10,664,461.

(51) Int. Cl.
| | |
|---|---|
| *G06F 11/00* | (2006.01) |
| *G06F 11/14* | (2006.01) |
| *G06F 16/11* | (2019.01) |
| *G06F 16/13* | (2019.01) |

(52) U.S. Cl.
CPC ........ *G06F 11/1458* (2013.01); *G06F 16/128* (2019.01); *G06F 16/13* (2019.01); *G06F 2201/84* (2013.01)

(58) Field of Classification Search
CPC .... G06F 16/128; G06F 16/13; G06F 11/1458; G06F 2201/84
See application file for complete search history.

(56) References Cited

U.S. PATENT DOCUMENTS

| | | | |
|---|---|---|---|
| 8,266,114 B2 | 9/2012 | Mace | |
| 9,824,095 B1 | 11/2017 | Taylor | |
| 9,916,203 B1 | 3/2018 | Pogde | |
| 9,959,138 B1 | 5/2018 | Vaish | |
| 10,078,583 B1 | 9/2018 | Wallace | |
| 2008/0270461 A1* | 10/2008 | Gordon | G06F 3/0667 |
| 2009/0106255 A1* | 4/2009 | Lacapra | G06F 11/1076 |

(Continued)

OTHER PUBLICATIONS

Lee et al: "On-Demand Snapshot: An Efficient Versioning File System for Phase-Change Memory II", IEEE Transactions on Knowledge and Data Engineering., vol. 25, No. 12, Dec. 2013 (Dec. 2013), pp. 2841-2853.

(Continued)

*Primary Examiner* — Diedra McQuitery
(74) *Attorney, Agent, or Firm* — Van Pelt, Yi & James LLP

(57) ABSTRACT

A size associated with a content file is determined to be greater than a threshold size. Contents of the content file split across a plurality of component files are stored. Metadata, for the content file, is updated to reference a plurality of component file metadata structures for the component files. A node of the metadata is configured to track different sizes of portions of the content file stored in different component files of the plurality of component files. File metadata of the content file is split across the plurality of component file metadata structures and each component file metadata structure of the plurality of component file metadata structures specifies a corresponding structure organizing data components for a corresponding portion of the content file.

19 Claims, 20 Drawing Sheets

(56) References Cited

U.S. PATENT DOCUMENTS

| | | |
|---|---|---|
| 2013/0198317 A1 | 8/2013 | Grube |
| 2014/0006465 A1* | 1/2014 | Davis .................... G06F 16/183 |
| | | 707/827 |
| 2014/0013046 A1 | 1/2014 | Corbett |
| 2015/0134879 A1 | 5/2015 | Zheng |
| 2015/0356110 A1 | 12/2015 | Lin |
| 2016/0034356 A1 | 2/2016 | Aron |
| 2016/0070644 A1* | 3/2016 | D'Sa ..................... G06F 3/0611 |
| | | 711/5 |
| 2017/0272209 A1* | 9/2017 | Yanovsky ........... H04L 67/1097 |
| 2017/0308305 A1* | 10/2017 | Goel ..................... G06F 3/0641 |
| 2017/0344590 A1 | 11/2017 | Aron |

OTHER PUBLICATIONS

Ungureanu et al: "HydraFS: a High-Throughput File System for the HYDRAstor Content-Addressable Storage System", USENIX, Jan. 14, 2010 (Jan. 14, 2010), pp. 1-14.

* cited by examiner

US 11,074,135 B2

LARGE CONTENT FILE OPTIMIZATION

CROSS REFERENCE TO OTHER APPLICATIONS

This application is a continuation-in-part of co-pending U.S. patent application Ser. No. 16/024,107, entitled LARGE CONTENT FILE OPTIMIZATION filed Jun. 29, 2018 which is incorporated herein by reference for all purposes.

BACKGROUND OF THE INVENTION

A file system is used to control how data is stored on and retrieved from a storage medium. Without a file system, information placed in the storage medium would be one large body of data with no way to tell where one content file stops and the next begins. A file system is responsible for organizing files and directories, and keeping track of which areas of the storage medium belong to which content file and which are not being used.

A file system stores all the file metadata associated with a content file, including the file name, the length of the contents of the content file, and the location of the content file, separate from the contents of the file. A write lock may be required to modify the content file and its associated metadata. However, in some instances, only a single write lock may be obtained. As a result, it may take a lot of time to write and/or modify the metadata and contents associated with a large content file (e.g., 100 TB).

BRIEF DESCRIPTION OF THE DRAWINGS

Various embodiments of the invention are disclosed in the following detailed description and the accompanying drawings.

DETAILED DESCRIPTION

Figure 1:
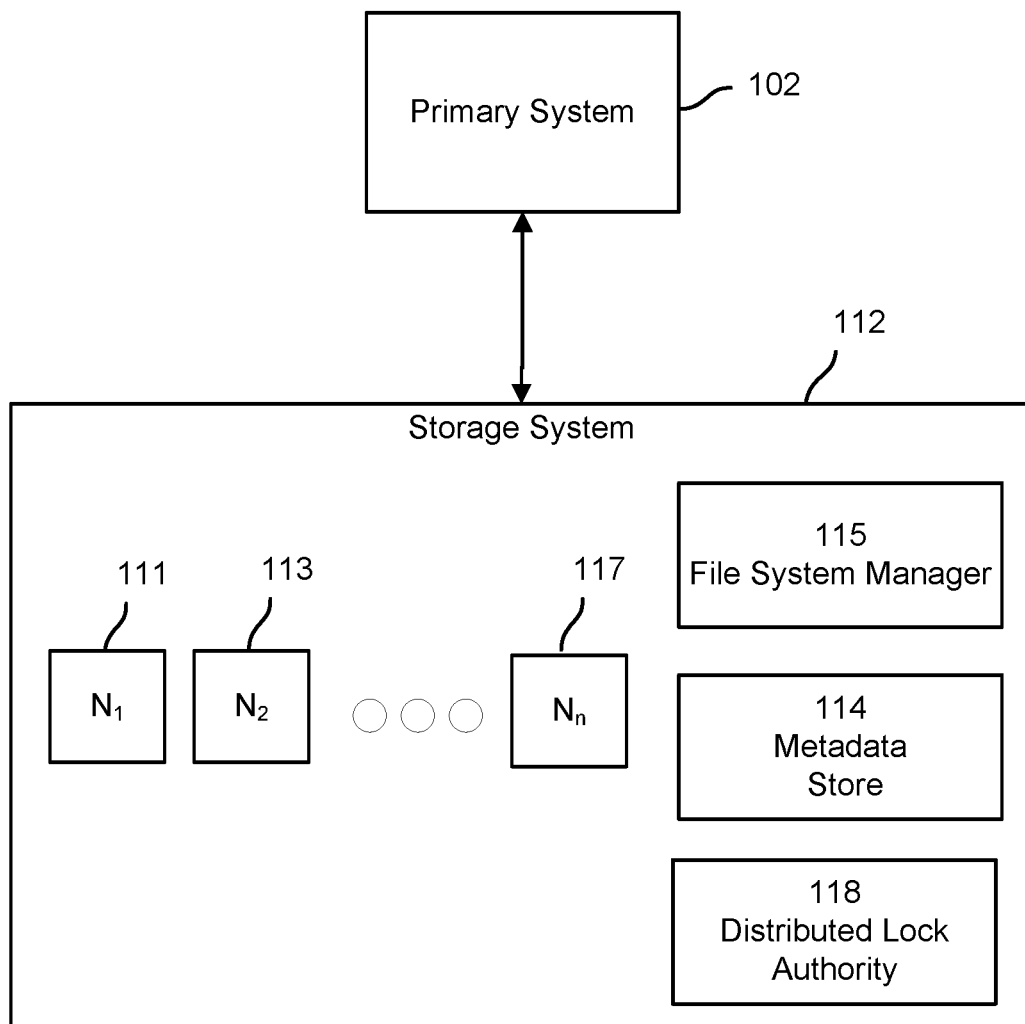
FIG. 1 is a block diagram illustrating an embodiment of a system for large content file optimization.

A primary system comprises an object, virtual machine, physical entity, file system, array backup, and/or volume that stores file system data. The file system data is comprised of a plurality of content files and associated metadata. The primary system may perform a backup snapshot of file system data according to a backup policy and send the backup snapshot to a storage system. A backup snapshot represents the state of a system at a particular point in time (e.g., the state of the file system data). The backup snapshot policy may require a full backup snapshot or an incremental backup snapshot to be performed. A full backup snapshot includes the entire state of the primary system at a particular point in time. An incremental backup snapshot includes the state of the primary system that has changed since a last backup snapshot.

A storage system may be comprised of a plurality of storage nodes. The storage system may ingest the file system data associated with the backup snapshot and store the file system data across the plurality of storage nodes. A file system manager of the storage system may organize the file system data of the backup snapshot using a tree data structure. An example of the tree data structure is a snapshot tree, which may be based on a B+ tree structure (or other type of tree structure in other embodiments). The tree data structure provides a view of the file system data corresponding to a backup snapshot. The view of the file system data corresponding to the backup snapshot is comprised of a snapshot tree and one or more file metadata structures (also referred herein as "file metadata structures").

A snapshot tree includes a root node, one or more levels of one or more intermediate nodes associated with the root node, and one or more leaf nodes associated with an intermediate node of the lowest intermediate level. The root node of a snapshot tree includes one or more pointers to one or more intermediate nodes. Each intermediate node includes one or more pointers to other nodes (e.g., a lower intermediate node or a leaf node). A leaf node may store file system metadata, data associated with a content file that is less than or equal to a limit size (e.g., 256 kB), an identifier of a data brick, one or more pointers to one or more file metadata structures (e.g., Blob structure), a pointer to a data chunk stored on the storage system, or data associated with a large content file. A leaf node may correspond to an inode.

A content file that is greater than the limit size (e.g., 256 kB) has an associated file metadata structure. The file metadata structure is configured to store the file metadata associated with a content file. The file metadata structure includes a root node, one or more levels of one or more intermediate nodes associated with the root node, and one or more leaf nodes associated with an intermediate node of the lowest intermediate level. A file metadata structure is similar to a snapshot tree, but a leaf node of a file metadata structure includes an identifier of a data brick associated with one or more data chunks of the content file.

The location of the one or more data chunks associated with a data brick may be identified using one or more data structures (e.g., list, table, etc.). A first data structure (e.g., chunk metadata table) may store information that associates a brick identifier with one or more chunk identifiers and one or more chunk file identifiers. A second data structure (e.g., chunk file metadata table) may associate a chunk file identifier with a chunk file storing a plurality of data chunks. In some embodiments, the first data structure and the second data structure are combined as a single data structure.

The one or more data chunks associated with a data brick may be located based on the chunk metadata table and the chunk file metadata table. For example, a first data brick having a first brick identifier may be associated with a first chunk identifier (e.g., SHA-1 hash value). The first chunk identifier may be used in conjunction with the chunk metadata table to identify a chunk file identifier. A chunk file having the identified chunk file identifier is comprised of a plurality of data chunks. The chunk file metadata table may be used to identify a location of the plurality of data chunks having the chunk identifier. The chunk file metadata table may include offset information of the plurality of data chunks within a chunk file. In some embodiments, the data chunks associated with a content file are distributed and stored across the plurality of storage nodes comprising the storage system. In other embodiments, the data chunks associated with a content file are stored on a single storage node of the storage system.

The storage system may receive a file system operation request (e.g., write, read, delete) and assign one of the plurality of storage nodes to handle the request. A requesting entity, such as one of the storage nodes, may request access to file system data stored on the storage system. A distributed lock authority is configured to provide synchronization locks to nodes in the tree data structure. A distributed lock authority may require the requesting entity to obtain a lock to perform a file system operation. The distributed lock authority is configured to provide at least two types of locks: a read lock and a write lock. A requesting entity that holds a read lock on a particular node is allowed to read the contents of that node, but is not allowed to modify that node. A requesting entity that holds a write lock on a particular node is allowed to both read and modify the contents of that node. Only one requesting entity may obtain a write lock on any particular node. More than one requesting entity may hold a read lock on any particular node.

To access the contents associated with a content file, a storage node may need to obtain a lock (e.g., write lock, read lock) for the leaf node of the snapshot tree that includes a pointer to a file metadata structure corresponding to the content file. In a multi-node system, a plurality of storage nodes may perform file system operations in parallel. For example, a first storage node may perform a read operation while a second storage node may perform a write operation. A plurality of storage nodes may simultaneously hold a read lock associated with the leaf node of a snapshot tree storing a pointer to the file metadata structure corresponding to the content file. However, to write and/or modify the file metadata associated with a content file, a requesting entity may be required to hold a write lock associated with the leaf node of a snapshot tree storing a pointer to the file metadata structure corresponding the content file. Only a single storage node may hold a write lock associated with the leaf node of a snapshot tree storing a pointer to the file metadata structure corresponding to the content file.

One or more content files may be larger than a threshold size (e.g., 100 TB). Such files may be referred hereinafter to as "large content files." An example of a large content file is a volume of a virtual machine. Each large content file may have a corresponding file metadata structure. The file metadata structure is configured to store the file metadata associated with the large content file. Creating and/or modifying the file metadata structure corresponding to a large content file may take a long time to perform because the file metadata structure creation and/or modification(s) cannot be performed in parallel by a plurality of storage nodes of the multi-node system because only a single node may hold a write lock to a leaf node of a snapshot tree that points to the file metadata structure corresponding to the large content file. As a result, the nodes of a file metadata structure may be created and/or modified by a single storage node in sequence rather than in parallel by a plurality of storage nodes.

For example, a backup snapshot may be performed, and the data associated with a new large content file is stored to the storage system. The file system manager is configured to generate a file metadata structure corresponding to the new large content file. The file metadata structure stores the file metadata associated with the new large content file. The file system manager may generate a new leaf node for the snapshot tree corresponding to the backup snapshot. The file system manager may configure the new leaf node to include a pointer to the file metadata structure corresponding to the new large content file. To generate the file metadata structure corresponding to the new large content file, the file system manager may be required to obtain a write lock associated with the new leaf node of the snapshot tree. Because only a single entity (e.g., storage node) may hold a write lock associated with the new leaf node, generating the file metadata structure corresponding to the new large content file must be performed in a sequential manner. For large content files, generating a file metadata structure corresponding to a new large content file may take a long period of time to perform. This is a bottleneck for the storage system because the storage system may have a large number of file system operations associated with content files and associated metadata to perform.

The large content file optimization technique disclosed herein may reduce the amount of time needed to create and/or modify a file metadata structure associated with a large content file because it enables the creation and/or modifications to be performed in parallel instead of in sequence.

A large content file may be stored on the storage system. In some embodiments, the large content file is included in a backup snapshot. In other embodiments, the large content file is a content file generated on or by the storage system (e.g., a system generated file, a user generated file, an application generated file, etc.). The large content file may be provided to the storage system in a plurality of portions. Each portion of the large content file may be referred to herein as a "component file." In some embodiments, the plurality of portions each have the same size. In some embodiments, the plurality of portions have different sizes. For example, a large content file may be comprised of a first part with a size of 1 MB, a second part with a size of 10 MB, . . . , and an nth part with a size of 50 MB. In some embodiments, some of the plurality of portions have the same size and some of the plurality of portions have different sizes. Instead of generating a single file metadata structure for the plurality of portions, the storage system may generate a corresponding component file metadata structure for each of the plurality of portions. This may allow a plurality of storage nodes of a storage system to update or modify the metadata associated with a large content file in parallel instead of in sequence. For example, a large content file may be associated with three component files and three corresponding component file metadata structures. A first node of the storage system may update or modify the component file metadata structure associated with a first portion of the large content file, while a second node of the storage system is updating or modifying the component file metadata structure associated with a second portion of the large content file, while a third node of the storage system is updating or modifying the component file metadata structure associated with the third portion of the large content file.

A snapshot tree may include a plurality of leaf nodes. The snapshot tree may include leaf nodes that correspond to the different component file metadata structures associated with a large content file. For example, a snapshot tree may include a first leaf node that corresponds to a first component file metadata structure, a second leaf node that corresponds to a second component file metadata structure, . . . , and an nth leaf node that corresponds to an nth component file metadata structure. A leaf node that corresponds to a component file metadata structure associated with a large content file may be referred to as a file inode.

The snapshot tree may include a leaf node that is configured to store information associated with each of the file inodes. Such a leaf node may be referred to as a directory inode. A directory inode of the snapshot tree may store corresponding pointers to each of the leaf nodes (e.g., file inodes) that include corresponding pointers to the component file metadata structures associated with the large content file. For example, the directory inode may store a first pointer to a first file inode that corresponds to a first component file metadata structure of a large content file, a second pointer to a second file inode that corresponds to a second component file metadata structure of the large content file, . . . , and an nth pointer to an nth file inode that corresponds to an nth component file metadata structure of the large content file. The directory inode of the snapshot tree may also store information that indicates which component file metadata structure is associated with which portion of the large content file. In some embodiments, the directory inode may store a first vector that indicates a size of the large content file data that is associated with a component file metadata structure. For example, the directory inode may store the vector {1, 10, . . . , 50}. This indicates that the first part of the file has a size of 1 MB, the second part has a size of 10 MB, . . . , and the nth part has a size of 50 MB. In some embodiments, the size of the large content file data is the same for a plurality of sequential component file metadata structures associated with the large content file. For example, a large content file may be comprised of a first part with a size of 1 MB, a second part with a size of 10 MB, a third part with a size of 10 MB, a third part with a size of 10 MB, . . . , and an nth part with a size of 50 MB. The directory inode may store a second vector that indicates a number of component file metadata structures with the same size. For example, the directory inode may store the vector {1, 3, . . . , 1}. This may reduce the amount of information stored by the directory inode of the snapshot tree because instead of storing the size associated with each component file metadata structure associated with a large content file, the size information may be condensed in the event a plurality of component sequential file metadata structures are associated with a same size of large content file data. When trying to perform a file system operation with respect to a large content file, a file system manager may use the information stored by the directory inode to perform the file system operation.

A leaf node of a file metadata structure may be configured to store an identifier of a data brick. A data brick may have a particular brick capacity (e.g., 256 kB). The brick capacity indicates a size of one or more data chunks to which the data brick may be associated. In some embodiments, a data brick is associated with a full capacity (e.g., 256 kB) of one or more data chunks. In some embodiments, a data brick is associated with less than a full capacity of one or more data chunks. The last portion of the plurality of portions associated with a large content file may not be brick aligned. A content file is brick aligned in the event the last brick of the component file metadata structure associated with the last portion of the content file, is at full capacity. A content file is not brick aligned in the event the last brick of the component file metadata structure associated with the last portion of the content file, is not at full capacity. In the event the last brick associated with a last portion of the content file is not brick aligned, the unused portion of the last brick may be reserved for the content file such that the last brick does not store information that corresponds to one or more data chunks associated with a different content file. For example, the last data brick of the last portion of a first content file may be associated with 150 kB of data chunks. The size of the data brick may 256 kB. 100 kB of the last data brick is not associated with any data chunks. Instead of using the 100 kB of the last data brick for one or more data chunks associated with a second content file, the last 100 kB of the last data brick may be reserved for the first content file. The one or more data chunks associated with the second content file may be associated with one or more other data bricks that are separate from the data bricks associated with the first content file, that is, in some embodiments, a data brick is not configured to be associated with multiple content files. For example, a content file may have a size of 7.9 MB. The last brick of the file metadata structure corresponding to the content file may be associated with a file offset of 7.7-7.9 MB. Instead of a first data brick associated with a second file having a starting file offset at 7.9 MB, the file offset associated with the last data brick may be extended from 7.9 MB to 8.0 MB (e.g., the last 100 kB is reserved for the first content file) such that the first data brick associated with the second file has a starting file offset of 8.0 MB, i.e., the file offsets associated with a content file are brick aligned.

In some embodiments, the storage system may store one or more content files that are smaller than a threshold size. A backup snapshot may include data associated with at least one of the one or more content files that are smaller than the threshold size. The data included in the backup snapshot may cause a content file previously stored by the storage system to become a large content file. The file metadata associated with the content file may be modified such that the file metadata associated with the content file is stored across a plurality of file metadata structures. The file metadata associated with a previously stored portion of the content file may remain in the previously stored file metadata structure. The file metadata associated with a new portion of the content file (e.g., the portion that cause the content file to become a large content file) may be stored across one or more additional file metadata structures.

A leaf node of a snapshot tree that includes a pointer to the file metadata structure corresponding to the previously stored portion of the content file may have a particular identifier (e.g., inode id). In the event a backup snapshot includes more data associated with the content file such that the content file becomes a large content file, the leaf node of the snapshot tree associated with the file metadata structure corresponding to the content file may be modified to become a directory inode where the directory inode has the particular identifier. The directory inode may include information that indicates which file metadata structure is associated with which portion of the large content file. For example, the content file may have a size of 64 GB of data before the backup snapshot. An incremental backup snapshot may include data that increases the size of the large content file from 64 GB to 65 GB, such that the size of the content file is greater than the large content file size threshold. A file system manager may generate a second file metadata structure for the content file. The second metadata structure may be configured to store the file metadata for file data with a file offset of 64 GB-65 GB. The leaf node may be modified to become a directory inode that is configured to store, as described above, a vector that indicates a size of the large content file data that is associated with a file metadata structure and a vector that indicates a number of file metadata structures with the same size.

The file metadata associated with a large content file is stored across a plurality of component file metadata structures. To modify one of the plurality of component file metadata structures, a storage node may be required to obtain a lock. In some embodiments, a component file metadata structure is modified by updating the metadata associated with a large content file. For example, a data chunk of the large content file may have been modified from data chunk A to data chunk B, i.e., data chunk A is replaced with data chunk B. The component file metadata structure may be modified such that a leaf node of the component file metadata structure references a data brick that is associated with data chunk B instead of referencing a data brick that is associated with data chunk A. To update the metadata associated with a large content file, a storage node may obtain a read lock for the directory inode associated with the large content file and a write lock for the file inode associated with the component file metadata structure to be updated.

In some embodiments, a component file metadata structure is modified by adding new metadata associated with a large content file. For example, one or more new data chunks may be added to the large content file. The component file metadata structure may be modified such that one or more leaf nodes corresponding to the one or more added data chunks are added to the component file metadata structure. For example, a data chunk C may be added to the large content file. Unlike the replacing scenario described above, data chunk C is not replacing a data chunk of the large content file. Rather, data chunk C is being added to the plurality of data chunks associated with the large content file. To add metadata to a large content file, a storage node may obtain a write lock for the directory inode associated with the large content file and a write lock for the file inode associated with the component file metadata structure to be updated. A write lock for the directory inode associated with the large content file is obtained to modify information stored by the directory inode. For example, a vector that stores size information associated with a plurality of component file metadata structures may be modified to indicate that the modified component file metadata structure has a different size. A vector that indicates a number of component file metadata structures with the same size may also be modified in the event the number of sequential component file metadata structures corresponding to content file portions storing the same amount of data has changed.

In some embodiments, a plurality of storage nodes obtain corresponding write locks for the leaf nodes of the snapshot tree that correspond to the large content file. For example, a first storage node may obtain a first write lock for a first file inode that corresponds to a first portion of the large content file, a second storage node may obtain a second write lock for a second file inode that corresponds to a second portion of the large content file, . . . , and an nth storage node may obtain an nth write lock for an nth file inode that corresponds to an nth portion of the large content file. This may enable a plurality of storage nodes to update in parallel the file metadata associated with a large content file, which reduces the amount of time needed to update the file metadata associated with a large content file.

FIG. 1 is a block diagram illustrating an embodiment of a system for large content file optimization. In the example shown, system 100 includes a primary system 102 and a storage system 112.

Primary system 102 is a computing system that stores file system data. Primary system 102 may be comprised of one or more servers, one or more computing devices, one or more storage devices, and/or a combination thereof. Primary system 102 may be configured to backup file system data to storage system 112 according to one or more backup snapshot policies. In some embodiments, a backup snapshot policy indicates that file system data is to be backed up on a periodic basis (e.g., hourly, daily, weekly, monthly, etc.). In other embodiments, a backup snapshot policy indicates that file system data is to be backed up when a threshold size of data has changed. In other embodiments, a backup snapshot policy indicates that file system data is to be backed up upon a command from a user associated with primary system 102. The backup snapshot policy may indicate when a full backup snapshot of primary system 102 is to be performed. A full backup snapshot stores the entire state of the primary system, (i.e., all of the file system data) at a particular point in time. In some embodiments, a full backup snapshot corresponds to the entire state of a workload (e.g., virtual machine, application, container, etc.) The backup snapshot policy may indicate when an incremental backup snapshot of primary system 102 is to be performed. An incremental backup snapshot stores the one or more data chunks of file system data that have changed since a last backup snapshot. The incremental backup snapshot may include one or more data chunks associated with a new content file. The incremental backup snapshot may include one or more new data chunks associated a content file previously stored by storage system 112. The new data chunks associated with a content file may correspond to modified data or new data.

Storage system 112 is a storage system configured to store file system data received from primary storage system 102. Storage system 112 may be comprised of one or more storage nodes 111, 113, 117. The one or more storage nodes may be one or more solid state drives, one or more hard disk drives, or a combination thereof. In one embodiment, storage system 112 is comprised of one solid state drive and three hard disk drives. The file system data included in a backup snapshot may be stored in one or more of the storage nodes. In some embodiments, storage system 112 is configured to store a plurality of files generated on or by storage system 112 (e.g., a system generated file, a user generated file, an application generated file, etc.). In some embodiments, storage system 112 is comprised of one or more virtual storage nodes that are operating in a cloud environment (e.g., public cloud, private cloud). Each virtual storage node has a corresponding amount of storage.

Storage system 112 may include a file system manager 115. File system manager 115 is configured to organize the file system data in a tree data structure. The tree data structure may include one or more leaf nodes that store a corresponding data key-value pair. A user may request a particular value by providing a particular data key to file system manager 115, which traverses a snapshot tree to find the value associated with the particular data key. A user may request a set of files within a particular range of data keys of a snapshot. File system manager 115 may be configured to generate a view of file system data based on a backup snapshot received from primary system 102. File system manager 115 may be configured to perform one or more modifications, as disclosed herein, to a tree data structure.

A tree data structure may be used to capture different versions of backup snapshots. The tree data structure allows a chain of snapshot trees corresponding to different backup versions of backup snapshots (i.e., different snapshot tree versions) to be linked together by allowing a node of a later version of a snapshot tree to reference a node of a previous version of a snapshot tree (e.g., a "snapshot tree forest"). For example, a root node or an intermediate node of the second snapshot tree corresponding to the second backup snapshot may reference an intermediate node or leaf node of the first snapshot tree corresponding to a first backup snapshot. The snapshot tree provides a view of the file system data corresponding to a backup snapshot.

A snapshot tree includes a root node, one or more levels of one or more intermediate nodes associated with the root node, and one or more leaf nodes associated with an intermediate node of the lowest intermediate level. The nodes of a snapshot tree may be stored across the plurality of storage nodes 111, 113, 117. The root node of a snapshot tree includes one or more pointers to one or more intermediate nodes. Each intermediate node includes one or more pointers to other nodes (e.g., a lower intermediate node or a leaf node). A leaf node may store file system metadata, data associated with a content file that is less than or equal to a limit size (e.g., 256 kB), an identifier of a data brick, a pointer to a file metadata structure, or a pointer to a data chunk stored on the storage system. A leaf node may be an inode. A leaf node may store file offset information associated with a large content file. The file metadata associated with a large content file may be stored across a plurality of file metadata structures. The file offset information may indicate which file metadata structure(s) to access for a particular file offset or range of file offsets.

File metadata associated with a content file that is larger than the limit size may be stored across the one or more storage nodes 111, 113, 117. A corresponding file metadata structure may be generated for the file metadata associated with a content file that is larger than the limit size. The data of a content file may be divided into a plurality of data chunks. A brick may be associated with one or more data chunks. A leaf node of a file metadata structure may correspond to one of the plurality of bricks. In some embodiments, the size of a brick is 256 kB. In some embodiments, the size of a content file is larger than a threshold size. The metadata associated with such a content file may be stored across a plurality of component file metadata structures.

Metadata store 114 may be distributed across storage nodes 111, 113, 117, that is, storage nodes 111, 113, 117 may store at least a portion of metadata store 114. In some embodiments, metadata store 114 is stored on one of the storage nodes 111, 113, 117. Metadata store 114 may be stored in the solid state drives of storage system 112, the one or more hard disk drives of storage system 112, and/or a combination thereof. Metadata store 114 may be configured to store the metadata associated with primary system 102 that is included in a backup snapshot. Metadata store 114 may be configured to store the file metadata associated with a plurality of content files stored on storage system 112. For example, metadata store 114 may store the view of file system data corresponding to a backup snapshot (e.g., a snapshot tree and one or more file metadata structures).

Metadata store 114 may be configured to store the key-value pairs associated with a snapshot tree and/or one or more file metadata structures. A key-value pair may be stored in a plurality of the storage nodes 111, 113, 117 (e.g., duplicate copies) to provide fault tolerance. One of the storage nodes may be a primary storage node for a key-value pair and one or more other storage nodes may be a secondary storage node for the key-value pair. In the event the primary storage node goes offline, one of the secondary storage nodes for the key-value pair may be online and store a copy of key-value pair. In the event storage system 112 receives a request for the key-value pair and the primary storage node for the key-value pair is offline, one of the secondary storage nodes for the key-value pair may be able to fulfill the request.

Metadata store 114 may store a first data structure (e.g., chunk metadata table) that is configured to associate brick identifiers with chunk identifiers and chunk file identifiers. Metadata store 114 may store a second data structure (e.g., chunk file metadata table) that associates a chunk file identifier with a chunk file storing a plurality of data chunks. In some embodiments, the first data structure and the second data structure are combined as a single data structure. The one or more data chunks associated with a data brick may be located based on the chunk metadata table and the chunk file metadata table. For example, a first data brick having a first brick identifier may be associated with a first chunk identifier (e.g., SHA-1 hash value). The first chunk identifier may be used in conjunction with the chunk metadata table to identify a chunk file identifier. A chunk file having the identified chunk file identifier is comprised of a plurality of data chunks. The chunk file metadata table may be used to identify a location of the plurality of data chunks. The chunk file metadata table may include offset information of the plurality of data chunks within a chunk file.

A snapshot tree and a file metadata structure may be traversed to a leaf node of the file metadata structure to identify a brick identifier (e.g., the value stored by a leaf node of the file metadata structure). The first and second data structures may be retrieved from metadata store 114. The brick identifier in combination with chunk metadata table and the chunk file metadata table may be used to identify a location of one or more data chunks of the content file corresponding to the file metadata structure. For example, a brick identifier and the chunk metadata table may be used to identify a corresponding chunk identifier and a corresponding chunk file identifier. The corresponding chunk file identifier and the chunk file metadata table may be used to determine a location of one or more data chunks associated with the content file corresponding to the file metadata structure. For example, a snapshot tree may be traversed to a leaf node pointing to a file metadata structure. The file metadata structure may be traversed to a leaf node. The leaf node of the file metadata structure may store the value of a brick identifier. The brick identifier, in conjunction with the chunk metadata table and chunk file metadata table may be used to locate the data associated with a content file.

Metadata store 114 may store the view of file system data corresponding to a backup snapshot. Metadata store 114 may also store data associated with a content file that is smaller than a limit size. Metadata store 114 may include a data structure (e.g., a map, a table, a list) that matches file metadata structures to their corresponding portions of a large content file. For example, the metadata associated with a large content file may be stored across three component file metadata structures. Each component file metadata structure may correspond to an offset range of the large content file. The data structure may include an entry that associates a first offset range of the large content file with a first file metadata structure, a second offset range of the large content file with a second file metadata structure, and a third offset range of the large content file with a third file metadata structure. Metadata store 114 may store a plurality of data structures that are configured to store different types of information (e.g., deduplication information, change file information, file table, chunk file metadata table, etc.).

Distributed lock authority 118 is configured to issue locks. Distributed lock authority 118 is configured to provide synchronization locks to nodes in the tree data structure. Distributed lock authority 118 may require the requesting entity (e.g., one of the storage nodes 111, 113, 117) to obtain a lock to perform a file system operation. Distributed lock authority 118 may be configured to provide one or more read locks and/or one or more write locks. A requesting entity that holds a read lock on a particular node of a snapshot tree is allowed to read the contents of that node, but is not allowed to modify that node. More than one requesting entity may hold a read lock on any particular node. A requesting entity that holds a write lock on a particular node of a snapshot tree is allowed to both read and modify the contents of that node. Only one requesting entity at a time may obtain a write lock on any particular node.

A write lock is needed to modify the value associated with a leaf node of a snapshot tree and/or a file metadata structure. For example, only a single storage node may hold a write lock associated with the leaf node of a snapshot tree storing a pointer to the file metadata structure corresponding to the content file. Creating and/or modifying the file metadata structure corresponding to a large content file would take a long time to perform if the file metadata structure creation and/or modification(s) cannot be performed in parallel by a plurality of storage nodes of the multi-node system. When only a single node holds a write lock to a leaf node of a snapshot tree that points to a file metadata structure corresponding to a large content file, the nodes of a file metadata structure may only be created and/or modified by a single storage node in sequence rather than in parallel by a plurality of storage nodes. In this case, because only a single entity (e.g., storage node) may hold a write lock associated with the new leaf node, generating the file metadata structure corresponding to the new content file must be performed in a sequential manner. In this scenario, for large content files, generating a file metadata structure corresponding to a new content file would take a long period of time to perform. This would be a bottleneck for such a storage system because such a storage system may have a large number of file system operations associated with content files and associated metadata to perform.

A large content file may be stored on storage system 112. In some embodiments, the large content file is included in a backup snapshot. In other embodiments, the large content file is a content file generated on or by storage system 112 (e.g., a system generated file, a user generated file, an application generated file, etc.). The large content file may be provided to storage system 112 in a plurality of portions. In some embodiments, the plurality of portions have the same size. In some embodiments, one or more of the plurality of portions have different sizes.

The file metadata associated with a large content file may be stored across a plurality of component file metadata structures. To modify one of the plurality of component file metadata structures, a storage node may be required to obtain a lock. In some embodiments, a component file metadata structure is modified by updating the metadata associated with a large content file. For example, a data chunk of the large content file may have been modified from data chunk A to data chunk B, i.e., data chunk A is replaced with data chunk B. The component file metadata structure may be modified such that a leaf node of the component file metadata structure references a data brick that is associated with data chunk B instead of referencing a data brick that is associated with data chunk A. To update the metadata associated with a large content file, a storage node may obtain a read lock for the directory inode associated with the large content file and a write lock for the file inode associated with the component file metadata structure to be updated.

In some embodiments, a component file metadata structure is modified by adding new metadata associated with a large content file. For example, one or more new data chunks may be added to the large content file. The component file metadata structure may be modified such that one or more leaf nodes corresponding to the one or more added data chunks are added to the component file metadata structure. For example, a data chunk C may be added to the large content file. Unlike the replacing scenario described above, data chunk C is not replacing a data chunk of the large content file. Rather, data chunk C is being added to the plurality of data chunks associated with the large content file. To add metadata to a large content file, a storage node may obtain a write lock for the directory inode associated with the large content file and a write lock for the file inode associated with the component file metadata structure to be updated. A write lock for the directory inode associated with the large content file is obtained to modify information stored by the directory inode. For example, a vector that stores size information associated with a plurality of component file metadata structures may be modified to indicate that the modified component file metadata structure has a different size. A vector that indicates a number of component file metadata structures with the same size may also be modified in the event the number of sequential component file metadata structures corresponding to content file portions storing the same amount of data has changed.

In some embodiments, a plurality of storage nodes obtain corresponding write locks for the leaf nodes of the snapshot tree that correspond to the large content file. For example, a first storage node may obtain a first write lock for a first file inode that corresponds to a first portion of the large content file, a second storage node may obtain a second write lock for a second file inode that corresponds to a second portion of the large content file, . . . , and an nth storage node may obtain an nth write lock for an nth file inode that corresponds to an nth portion of the large content file. This may enable a plurality of storage nodes to update in parallel the file metadata associated with a large content file, which reduces the amount of time needed to update the file metadata associated with a large content file.

File system manager 115 may generate a snapshot tree that is comprised of a plurality of leaf nodes. The snapshot tree may include leaf nodes that correspond to the different component file metadata structures associated with a large content file. For example, a snapshot tree may include a first leaf node that corresponds to a first component file metadata structure, a second leaf node that corresponds to a second component file metadata structure, ..., and an nth leaf node that corresponds to an nth component file metadata structure. A leaf node that corresponds to a component file metadata structure associated with a large content file may be referred to as a file inode.

File system manager 115 may generate a leaf node that is configured to store information associated with each of the file inodes. Such a leaf node may be referred to as a directory inode. A directory inode of the snapshot tree may store corresponding pointers to each of the leaf nodes (e.g., file inodes) that include corresponding pointers to the component file metadata structures associated with the large content file. The directory inode of the snapshot tree may also store information that indicates which component file metadata structure is associated with which portion of the large content file. In some embodiments, the directory inode may store a first vector that indicates a size of the large content file data that is associated with a component file metadata structure. For example, the directory inode may store the vector {1, 10, ..., 50}. This indicates that the first part of the file has a size of 1 MB, the second part has a size of 10 MB, ..., and the nth part has a size of 50 MB. In some embodiments, the size of the large content file data is the same for a plurality of sequential component file metadata structures associated with the large content file. For example, a large content file may be comprised of a first part with a size of 1 MB, a second part with a size of 10 MB, a third part with a size of 10 MB, a third part with a size of 10 MB, ..., and an nth part with a size of 50 MB. The directory inode may store a second vector that indicates a number of component file metadata structures with the same size. For example, the directory inode may store the vector {1, 3, ..., 1}. This may reduce the amount of information stored by the directory inode because instead of storing the size associated with each component file metadata structure associated with a large content file, the size information may be condensed in the event a plurality of sequential component file metadata structures are associated with a same size of large content file data. When trying to perform a file system operation with respect to a large content file, file system manager 115 may use the information stored by the directory inode to perform the file system operation. For example, to access a file offset of 4-5 MB of the large content file, the directory inode may be analyzed to determine that a component file metadata structure that corresponds to a file offset of 1-11 MB may be traversed to access the file offset of 4-5 MB of the large content file.

In some embodiments, storage system 112 may store one or more content files that are smaller than a threshold size. A backup snapshot may include data associated with at least one of the one or more content files that are smaller than the threshold size. The data included in the backup snapshot may cause a content file previously stored by storage system 112 to become a large content file. The file metadata associated with the content file may be modified such that the file metadata associated with the content file is stored across a plurality of component file metadata structures. The file metadata associated with a previously stored portion of the content file may remain in the previously stored file metadata structure. The file metadata associated with a new portion of the content file (e.g., the portion that cause the content file to become a large content file) may be stored across one or more additional file metadata structures.

A leaf node of a snapshot tree that includes a pointer to the file metadata structure corresponding to the previously stored portion of the content file may have a particular identifier (e.g., inode id). In the event a backup snapshot includes more data associated with the content file such that the content file becomes a large content file, the leaf node of the snapshot tree associated with the file metadata structure corresponding to the content file may be modified to become a directory inode where the directory inode has the particular identifier. The directory inode may include information that indicates which file metadata structure is associated with which portion of the large content file. For example, the content file may have a size of 64 GB of data before the backup snapshot. An incremental backup snapshot may include data that increases the size of the large content file from 64 GB to 65 GB, such that the size of the content file is greater than the large content file size threshold. A file system manager may generate a second file metadata structure for the content file. The second metadata structure may be configured to store the file metadata for file data with a file offset of 64 GB-65 GB. The leaf node may be modified to become a directory inode that is configured to store, as described above, a vector that indicates a size of the large content file data that is associated with a file metadata structure and a vector that indicates a number of file metadata structures with the same size.

Figure 2A:
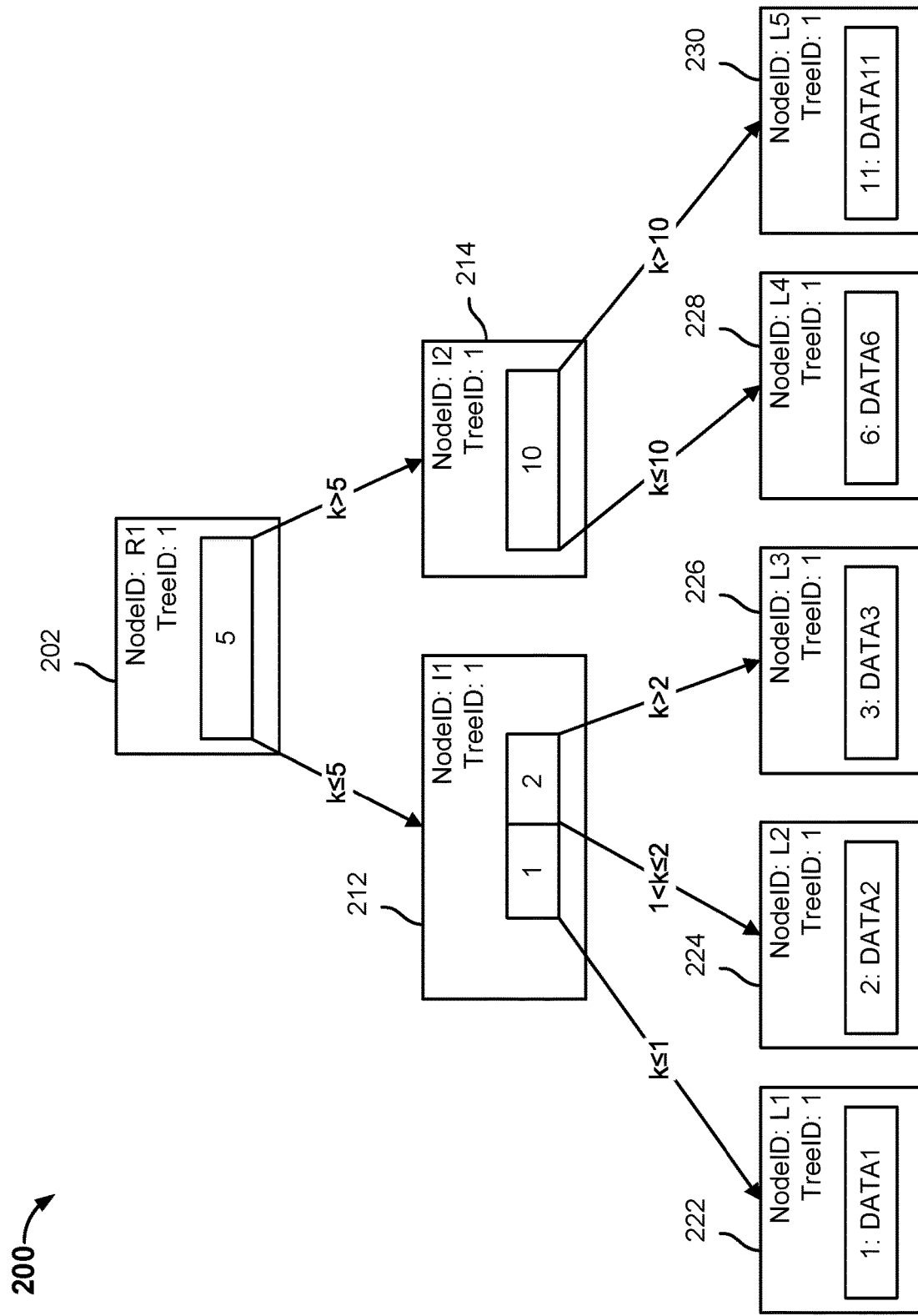
FIG. 2A is a block diagram illustrating an embodiment of a tree data structure.

FIG. 2A is a block diagram illustrating an embodiment of a tree data structure. A tree data structure may be used to represent the file system data that is stored on a storage system, such as storage system 112. The file system data may include metadata for a distributed file system and may include information, such as chunk identifier, chunk offset, file size, directory structure, file permissions, physical storage locations of the content files, etc. A file system manager, such as file system manager 115, may generate tree data structure 200. Tree data structure 200 may correspond to a full backup snapshot.

Tree data structure 200 is comprised of a snapshot tree that includes root node 202, intermediate nodes 212, 214, and leaf nodes 222, 224, 226, 228, and 230. Although tree data structure 200 includes one intermediate level between root node 202 and leaf nodes 222, 224, 226, 228, 230, any number of intermediate levels may be implemented. Tree data structure 200 may correspond to a backup snapshot of file system data at a particular point in time, for example, at time $t_0$. The backup snapshot may be received from a primary system, such as primary system 102. The snapshot tree in conjunction with a plurality of file metadata structures may provide a complete view of the primary system associated with the backup snapshot for the particular point in time.

A root node is the starting point of a snapshot tree and may include pointers to one or more other nodes. An intermediate node is a node to which another node points (e.g., root node, other intermediate node) and includes one or more pointers to one or more other nodes. A leaf node is a node of the snapshot tree that does not have child nodes of the snapshot tree. Each node of the tree structure includes a view identifier of a view with which the node is associated (e.g., TreeID).

A leaf node may be configured to store key-value pairs of file system data. A data key k is a lookup value by which a particular leaf node may be accessed. For example, "1" is a data key that may be used to lookup "DATA1" of leaf node 222. The data key k may correspond to a brick number of a data brick. A data brick may be associated with one or more data blocks. In some embodiments, the leaf node is configured to store file system metadata (e.g., chunk identifier (e.g., hash value, SHA-1, etc.), file size, directory structure, file permissions, physical storage locations of the content files, etc.). A leaf node may store a data key k and a pointer to a location that stores the value associated with the data key.

In some embodiments, a leaf node is configured to store the data associated with a content file when the size the content file is less than or equal to a limit size (e.g., 256 kB). In some embodiments, a leaf node includes a pointer to a file metadata structure (e.g., blob structure) when the size of file metadata associated with a content file is larger than the limit size.

In some embodiments, a leaf node is associated with a large content file and stores information that indicates which component file metadata structure is associated with which portion of the large content file. For example, the leaf node may be a directory inode. In some embodiments, the leaf node may store a first vector that indicates a size of the large content file data that is associated with a component file metadata structure. In some embodiments, the size of the large content file data is the same for a plurality of sequential component file metadata structures associated with the large content file. The leaf node may store a second vector that indicates a number of sequential component file metadata structures with the same size. This may reduce the amount of information stored by the leaf node because instead of storing the size associated with each component file metadata structure associated with a large content file, the size information may be condensed in the event a plurality of sequential component file metadata structures are associated with a same size of large content file data. In some embodiments, the leaf node is a file inode and stores a pointer to one of the component file metadata structures associated with a large content file.

A root node or an intermediate node may include one or more node keys. The node key may be an integer value or a non-integer value. Each node key indicates a division between the branches of the node and indicates how to traverse the tree structure to find a leaf node, i.e., which pointer to follow. For example, root node 202 may include a node key of "5." A data key k of a key-value pair that is less than or equal to the node key is associated with a first branch of the node and a data key k of a key-value pair that is greater than the node key is associated with a second branch of the node. In the above example, to find a leaf node storing a value associated with a data key of "1," "2," or "3," the first branch of root node 202 would be traversed to intermediate node 212 because the data keys of "1," "2", and "3" are less than or equal to the node key "5." To find a leaf node storing a value associated with a data key of "6" or "11," the second branch of root node 202 would be traversed to intermediate node 214 because data keys "6" and "11" are greater than the node key of "5."

A data key k of a key-value pair is not limited to a numerical value. In some embodiments, non-numerical data keys may be used for a data key-value pair (e.g., "name," "age", etc.) and a numerical number may be associated with the non-numerical data key. For example, a data key of "name" may correspond to a numerical key of "5." Data keys that alphabetically come before the word "name" or is the word "name" may be found following a left branch associated with a node. Data keys that alphabetically come after the word "name" may be found by following a right branch associated with the node. In some embodiments, a hash function may be associated with the non-numerical data key and may be used to determine which branch of a node with is associated with a non-numerical data key. For example, a hash function may be applied to a non-numerical data key, resulting in a corresponding hash value; the hash value may be used to select which branch of a node is associated with the corresponding non-numerical data key. Accordingly, it can be determined that a first bucket is associated with a first branch of a node and a second bucket is associated with a second branch of the node.

In the example shown, root node 202 includes a pointer to intermediate node 212 and a pointer to intermediate node 214. Root node 202 includes a NodeID of "R1" and a TreeID of "1." The NodeID identifies the name of the node. The TreeID identifies the view with which the node is associated. When a change is made to data stored in a leaf node as described with respect to FIGS. 2B, 2C, and 2D, the TreeID is used to determine whether a copy of a node is to be made.

Root node 202 includes a node key that divides a set of pointers into two different subsets. Leaf nodes (e.g., "1-3") with a data key k that is less than or equal to the node key are associated with a first branch and leaf nodes (e.g., "6, 11") with a data key k that is greater than the node key are associated with a second branch. Leaf nodes with a data key of "1," "2," or "3" may be found by traversing tree data structure 200 from root node 202 to intermediate node 212 because the data keys have a value that is less than or equal to the node key. Leaf nodes with a data key of "6" or "11" may be found by traversing tree data structure 200 from root node 202 to intermediate node 214 because the data keys have a value that is greater than the node key.

Root node 202 includes a first set of pointers. The first set of pointers associated with a data key less than the node key (e.g., "1", "2," or "3") indicates that traversing tree data structure 200 from root node 202 to intermediate node 212 will lead to a leaf node with a data key of "1," "2," or "3." Intermediate node 214 includes a second set of pointers. The second set of pointers associated with a data key greater than the node key indicates that traversing tree data structure 200 from root node 202 to intermediate node 214 will lead to a leaf node with a data key of "6" or "11."

Intermediate node 212 includes a pointer to leaf node 222, a pointer to leaf node 224, and a pointer to leaf node 226. Intermediate node 212 includes a NodeID of "I1" and a TreeID of "1." Intermediate node 212 includes a first node key of "1" and a second node key of "2." The data key k for leaf node 222 is a value that is less than or equal to the first node key. The data key k for leaf node 224 is a value that is greater than the first node key and less than or equal to the second node key. The data key k for leaf node 226 is a value that is greater than the second node key. The pointer to leaf node 222 indicates that traversing tree data structure 200 from intermediate node 212 to leaf node 222 will lead to the node with a data key of "1." The pointer to leaf node 224 indicates that traversing tree data structure 200 from intermediate node 212 to leaf node 224 will lead to the node with a data key of "2." The pointer to leaf node 226 indicates that traversing tree data structure 200 from intermediate node 212 to leaf node 226 will lead to the node with a data key of "3."

Intermediate node 214 includes a pointer to leaf node 228 and a pointer to leaf node 230. Intermediate node 212 includes a NodeID of "I2" and a TreeID of "1." Intermediate node 214 includes a node key of "10." The data key k for leaf node 228 is a value that is less than or equal to the node key. The data key k for leaf node 230 is a value that is greater than the node key. The pointer to leaf node 228 indicates that traversing tree data structure 200 from intermediate node 214 to leaf node 228 will lead to the node with a data key of "6." The pointer to leaf node 230 indicates that traversing tree data structure 200 from intermediate node 214 to leaf node 230 will lead the node with a data key of "11."

Leaf node 222 includes a data key-value pair of "1: DATA1." Leaf node 222 includes NodeID of "L1" and a TreeID of "1." To view the value associated with a data key of "1," tree data structure 200 is traversed from root node 202 to intermediate node 212 to leaf node 222. In some embodiments, leaf node 222 is configured to store metadata. In other embodiments, leaf node 222 is configured to store content file data when the size of the content file is less than or equal to a limit size. In other embodiments, leaf node 222 is a file inode and is configured to store a pointer to a file metadata structure (e.g., file metadata tree). In some embodiments, leaf node 222 is configured to store an identifier of a file metadata structure. In some embodiments, leaf node 222 is a directory inode and is configured to store information that indicates which component file metadata structure is associated with which portion of the large content file. In some embodiments, leaf node 222 includes pointers to two or more other leaf nodes (e.g., file inodes).

Leaf node 224 includes a data key-value pair of "2: DATA2." Leaf node 224 includes NodeID of "L2" and a TreeID of "1." To view the value associated with a data key of "2," tree data structure 200 is traversed from root node 202 to intermediate node 212 to leaf node 224. In some embodiments, leaf node 224 is configured to store metadata. In other embodiments, leaf node 224 is configured to store content file data when the size of the content file is less than or equal to a limit size. In other embodiments, leaf node 224 is a file inode and is configured to store a pointer to a file metadata structure (e.g., file metadata tree). In some embodiments, leaf node 224 is configured to store an identifier of a file metadata structure. In some embodiments, leaf node 224 is a directory inode and is configured to store information that indicates which component file metadata structure is associated with which portion of the large content file. In some embodiments, leaf node 224 includes pointers to two or more other leaf nodes (e.g., file inodes).

Leaf node 226 includes a data key-value pair of "3: DATA3." Leaf node 226 includes NodeID of "L3" and a TreeID of "1." To view the value associated with a data key of "3," tree data structure 200 is traversed from root node 202 to intermediate node 212 to leaf node 226. In some embodiments, leaf node 226 is configured to store metadata. In other embodiments, leaf node 226 is configured to store content file data when the size of the content file is less than or equal to a limit size. In other embodiments, leaf node 226 is a file inode and is configured to store a pointer to a file metadata structure (e.g., file metadata tree). In some embodiments, leaf node 226 is configured to store an identifier of a file metadata structure. In some embodiments, leaf node 226 is a directory inode and is configured to store information that indicates which component file metadata structure is associated with which portion of the large content file. In some embodiments, leaf node 226 includes pointers to two or more other leaf nodes (e.g., file inodes).

Leaf node 228 includes a data key-value pair of "6: DATA6." Leaf node 228 includes NodeID of "L4" and a TreeID of "1." To view the value associated with a data key of "6," tree data structure 200 is traversed from root node 202 to intermediate node 214 to leaf node 228. In some embodiments, leaf node 228 is configured to store metadata. In other embodiments, leaf node 228 is configured to store content file data when the size of the content file is less than or equal to a limit size. In other embodiments, leaf node 228 is a file inode and is configured to store a pointer to a file metadata structure (e.g., file metadata tree). In some embodiments, leaf node 228 is configured to store an identifier of a file metadata structure. In some embodiments, leaf node 228 is a directory inode and is configured to store information that indicates which component file metadata structure is associated with which portion of the large content file. In some embodiments, leaf node 228 includes pointers to two or more other leaf nodes (e.g., file inodes).

Leaf node 230 includes a data key-value pair of "11: DATA11." Leaf node 230 includes NodeID of "L5" and a TreeID of "1." To view the value associated with a data key of "11," tree data structure 200 is traversed from root node 202 to intermediate node 214 to leaf node 230. In some embodiments, leaf node 230 is configured to store metadata. In other embodiments, leaf node 230 is configured to store content file data when the size of the content file is less than or equal to a limit size. In other embodiments, leaf node 230 is a file inode and is configured to store a pointer to a file metadata structure (e.g., file metadata tree). In some embodiments, leaf node 230 is configured to store an identifier of a file metadata structure. In some embodiments, leaf node 230 is a directory inode and is configured to store information that indicates which component file metadata structure is associated with which portion of the large content file. In some embodiments, leaf node 230 includes pointers to two or more other leaf nodes (e.g., file inodes).

Figure 2B:
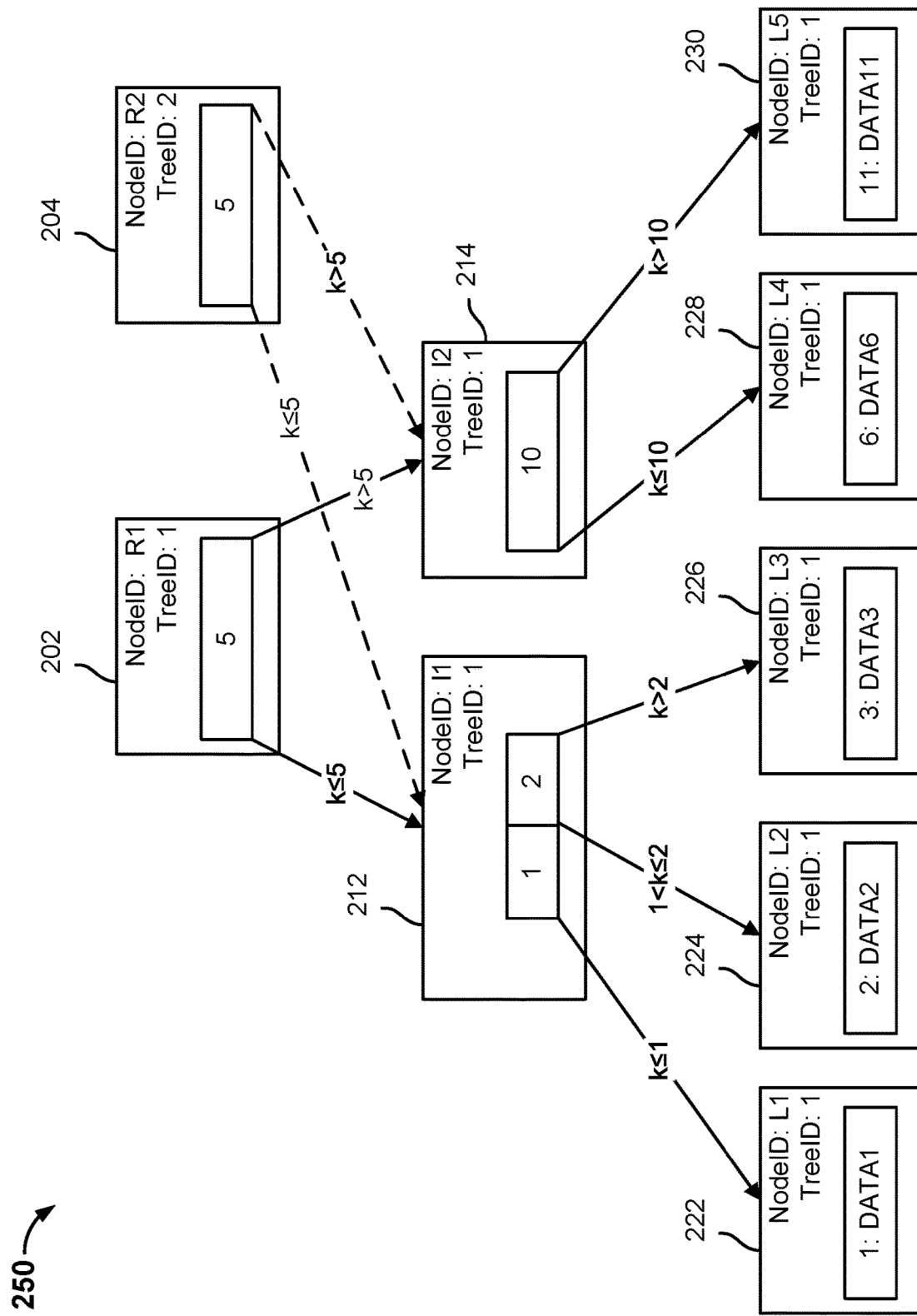
FIG. 2B is a block diagram illustrating an embodiment of a cloned snapshot tree.

FIG. 2B is a block diagram illustrating an embodiment of a cloned snapshot tree. A snapshot tree may be cloned when a snapshot tree is added to a tree data structure. In some embodiments, tree data structure 250 may be created by a storage system, such as storage system 112. The file system data of a primary system, such as primary system 102, may be backed up to a storage system, such as storage system 112. A subsequent backup snapshot may correspond to an incremental backup snapshot. The manner in which the file system data corresponding to the subsequent backup snapshot is stored in storage system may be represented by a tree data structure. The tree data structure corresponding to the subsequent backup snapshot is generated in part by cloning a snapshot tree associated with a previous backup snapshot.

In the example shown, tree data structure 250 includes root nodes 202, 204, intermediate nodes 212, 214, and leaf nodes 222, 224, 226, 228, and 230. Tree data structure 250 can be used to capture different versions of file system data at different moments in time. A tree data structure may also efficiently locate desired metadata by traversing a particular version of a snapshot tree included in the tree data structure. In some embodiments, the tree data structure allows a chain of backup snapshot versions (i.e., snapshot trees) to be linked together by allowing a node of a later version of a snapshot tree to reference a node of a previous version of a snapshot tree. For example, a snapshot tree with root node 204 is linked to a snapshot tree with root node 202. Each time a snapshot is performed, a new root node may be created and the new root node includes the same set of pointers included in the previous root node, that is the new root node of the snapshot may be linked to one or more intermediate nodes associated with a previous snapshot. The new root node also includes a different NodeID and a different TreeID. The TreeID is the view identifier associated with a view of the primary system associated with the backup snapshot for the particular moment in time.

In some embodiments, a root node is associated with a current view of the file system data. A current view may still accept one or more changes to the data. In the example shown, root node 204 is associated with a current view of the file system data.

In other embodiments, a root node is associated with a snapshot view of the file system data. A snapshot view may represent a state of the file system data at a particular moment in time in the past and is not updated. In the example shown, root node 202 is associated with a snapshot view of the file system data.

To generate a snapshot tree corresponding to an incremental backup snapshot at $t_1$, root node 202 is cloned, i.e., copied. In the example shown, root node 204 is a copy of root node 202. Similar to root node 202, root node 204 includes the same pointers as root node 202, but includes a different NodeID and a different TreeID. Root node 204 includes a first set of pointers to intermediate node 212. The first set of pointers associated with a data key k less than or equal to the node key (e.g., "1," "2," or "3") indicates that traversing tree data structure 250 from root node 204 to intermediate node 212 will lead to a leaf node with a data key of "1," "2," or "3." Root node 204 includes a second set of pointers to intermediate node 214. The second set of pointers associated with a data key k greater than the node key indicates that traversing tree data structure 250 from root node 204 to intermediate node 214 will lead to a leaf node with a data key of "6" or "11." Root node 204 includes a NodeID of "R2" and a TreeID of "2."

Figure 2C:
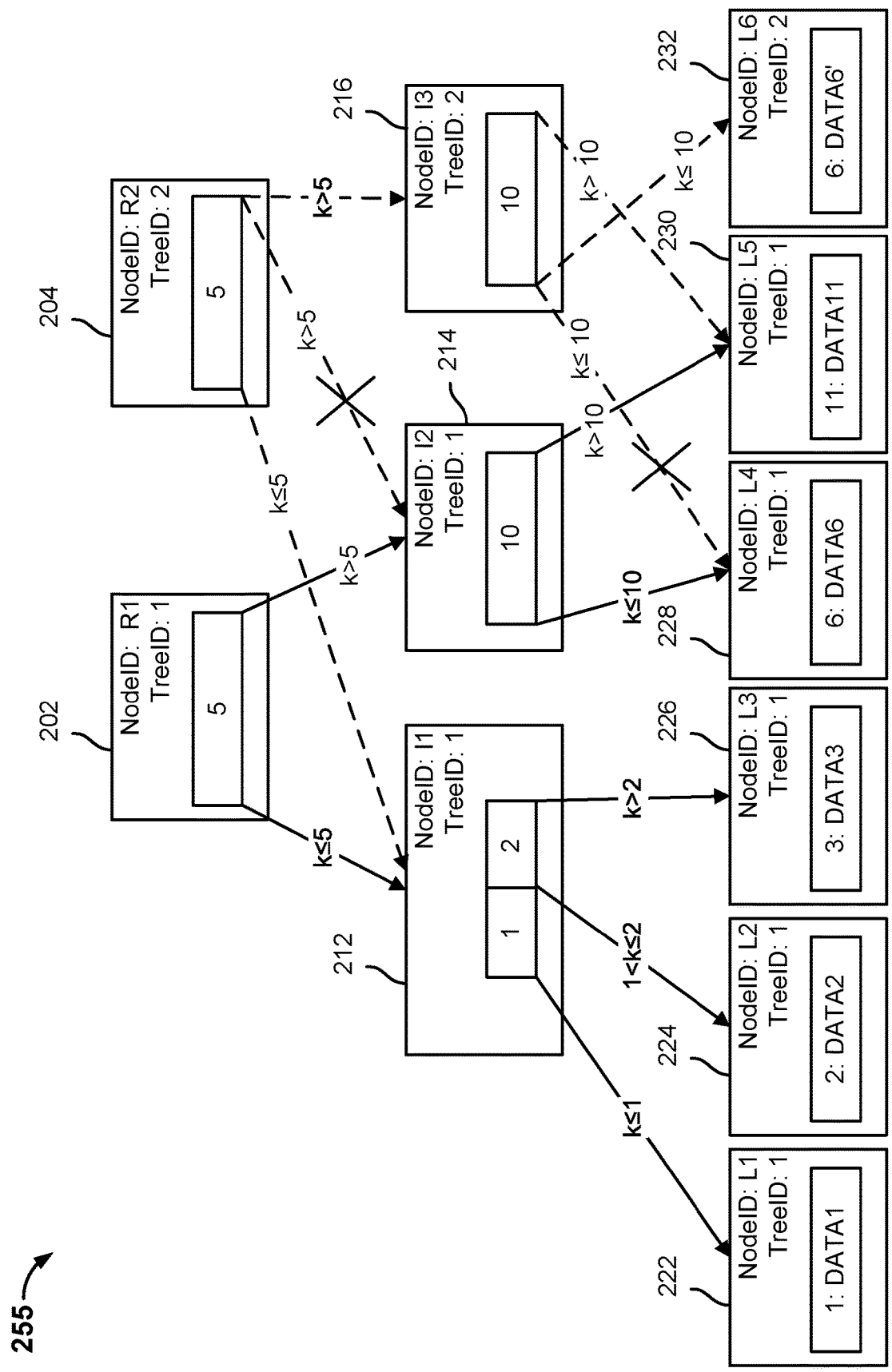
FIG. 2C is a block diagram illustrating an embodiment of modifying a cloned snapshot tree.

FIG. 2C is a block diagram illustrating an embodiment of modifying a cloned snapshot tree. In the example shown, tree data structure 255 may be modified by a file system manager, such as file system manager 105. A snapshot tree with a root node 204 may be a current view of the file system data, for example, at time $t_1$.

In the example shown, the value "DATA6" has been modified to be "DATA6'." In some embodiments, leaf node 228 has been converted from a file inode to a directory inode. For example, the value of "DATA6" may point to a file metadata structure corresponding to a content file (e.g., before the content file became a large content file) and the value of "DATA6'" may store corresponding pointers to each of the leaf nodes (e.g., file inodes) that include corresponding pointers to the component file metadata structures associated with the large content file and store information that indicates which component file metadata structure is associated with which portion of the large content file. In some embodiments, the value of a key value pair has been modified. In other embodiments, the value of the key pair is the file data of associated with a content file that is smaller than or equal to a limit size. In other embodiments, the value of the key value pair points to a different file metadata structure (e.g., a file metadata structure corresponding to a different version of a file, a component file metadata structure corresponding to a different version of a portion of a file). The different file metadata structure may be a modified version of the file metadata structure that the leaf node previously pointed. In some embodiments, the value of the key value pair is modified to store information that indicates which component file metadata structure is associated with which portion of the large content file.

To modify the snapshot tree at $t_1$, the file system manager starts at root node 204 because that is the root node associated with snapshot tree at time $t_1$. The value "DATA6" is associated with the data key "6." The file system manager traverses snapshot tree 255 from root node 204 until it reaches a target node, in this example, leaf node 228. The file system manager compares the TreeID at each intermediate node and leaf node with the TreeID of the root node. In the event the TreeID of a node matches the TreeID of the root node, the file system manager proceeds to the next node. In the event the TreeID of a node does not match the TreeID of the root node, a shadow copy of the node with the non-matching TreeID is made. A shadow copy is a copy of a node and includes the same pointers as the copied node, but includes a different NodeID and TreeID. For example, to reach a leaf node with a data key of "6," the file system manager begins at root node 204 and proceeds to intermediate node 214. The file system manager compares the TreeID of intermediate node 214 with the TreeID of root node 204, determines that the TreeID of intermediate node 214 does not match the TreeID of root node 204, and creates a copy of intermediate node 214. The intermediate node copy 216 includes the same set of pointers as intermediate node 214, but includes a TreeID of "2" to match the TreeID of root node 204. The file system manager updates a pointer of root node 204 to point to intermediate node 216 instead of pointing to intermediate node 214. The file system manager traverses tree data structure 255 from intermediate node 216 to leaf node 228, determines that the TreeID of leaf node 228 does not match the TreeID of root node 204, and creates a copy of leaf node 228. Leaf node copy 232 stores the modified value "DATA6'" and includes the same TreeID as root node 204. The file system manager updates a pointer of intermediate node 216 to point to leaf node 232 instead of pointing to leaf node 228.

In some embodiments, leaf node 232 stores the value of a key value pair that has been modified. In other embodiments, leaf node 232 stores the modified data associated with a content file that is smaller than or equal to a limit size. In other embodiments, leaf node 232 stores a pointer to a component file metadata structure associated with a large content file. In some embodiments, leaf node 232 is configured to store information that indicates which component file metadata structure is associated with which portion of the large content file. In some embodiments, leaf node 232 is configured to store corresponding pointers to each of the leaf nodes (e.g., file inodes) that include corresponding pointers to the component file metadata structures associated with the large content file.

Figure 2D:
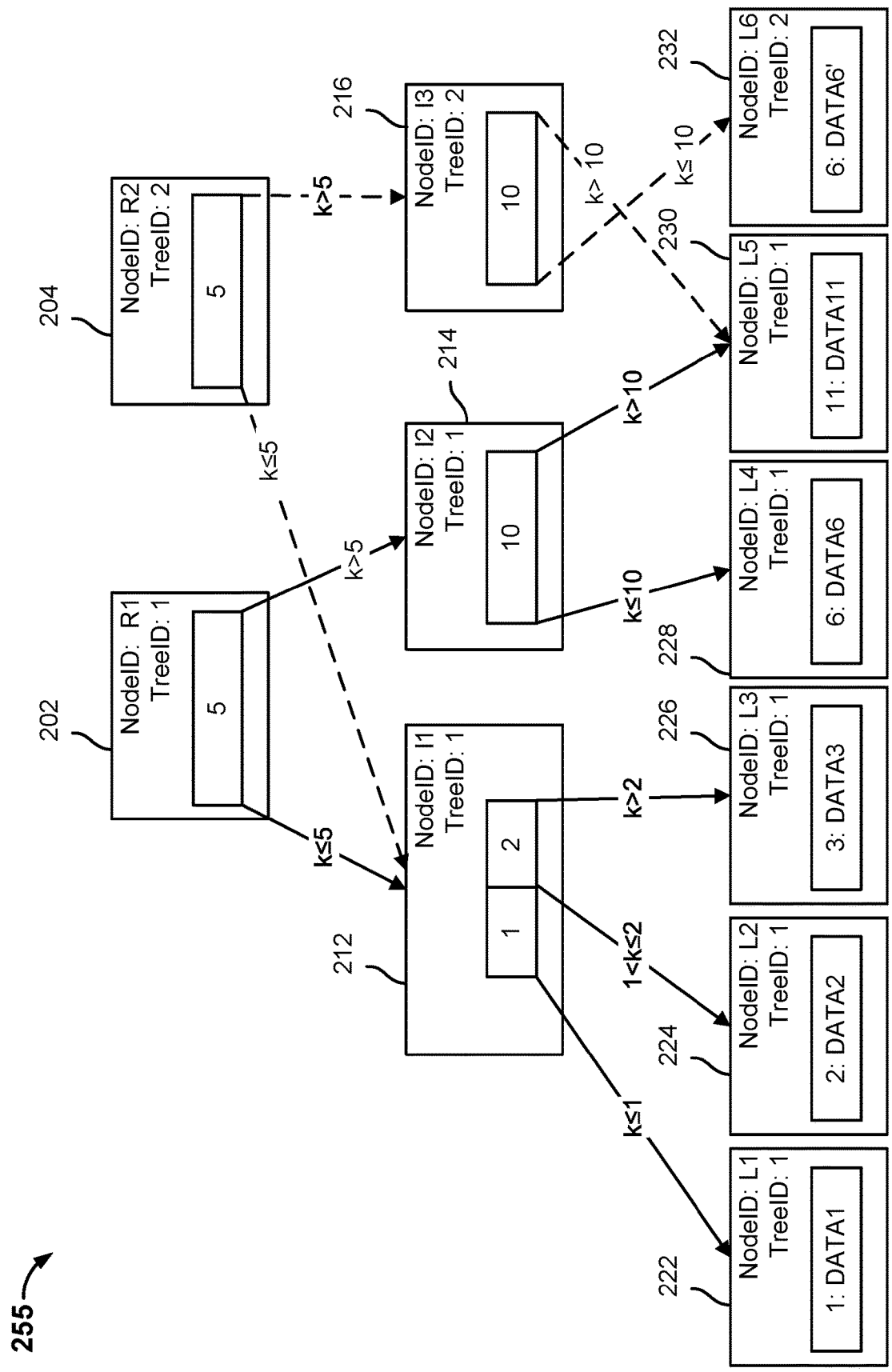
FIG. 2D is a block diagram illustrating an embodiment of a modified snapshot tree.

FIG. 2D is a block diagram illustrating an embodiment of a modified snapshot tree. Tree data structure 255 shown in FIG. 2D illustrates a result of the modifications made to a snapshot tree as described with respect to FIG. 2C.

Figure 3A:
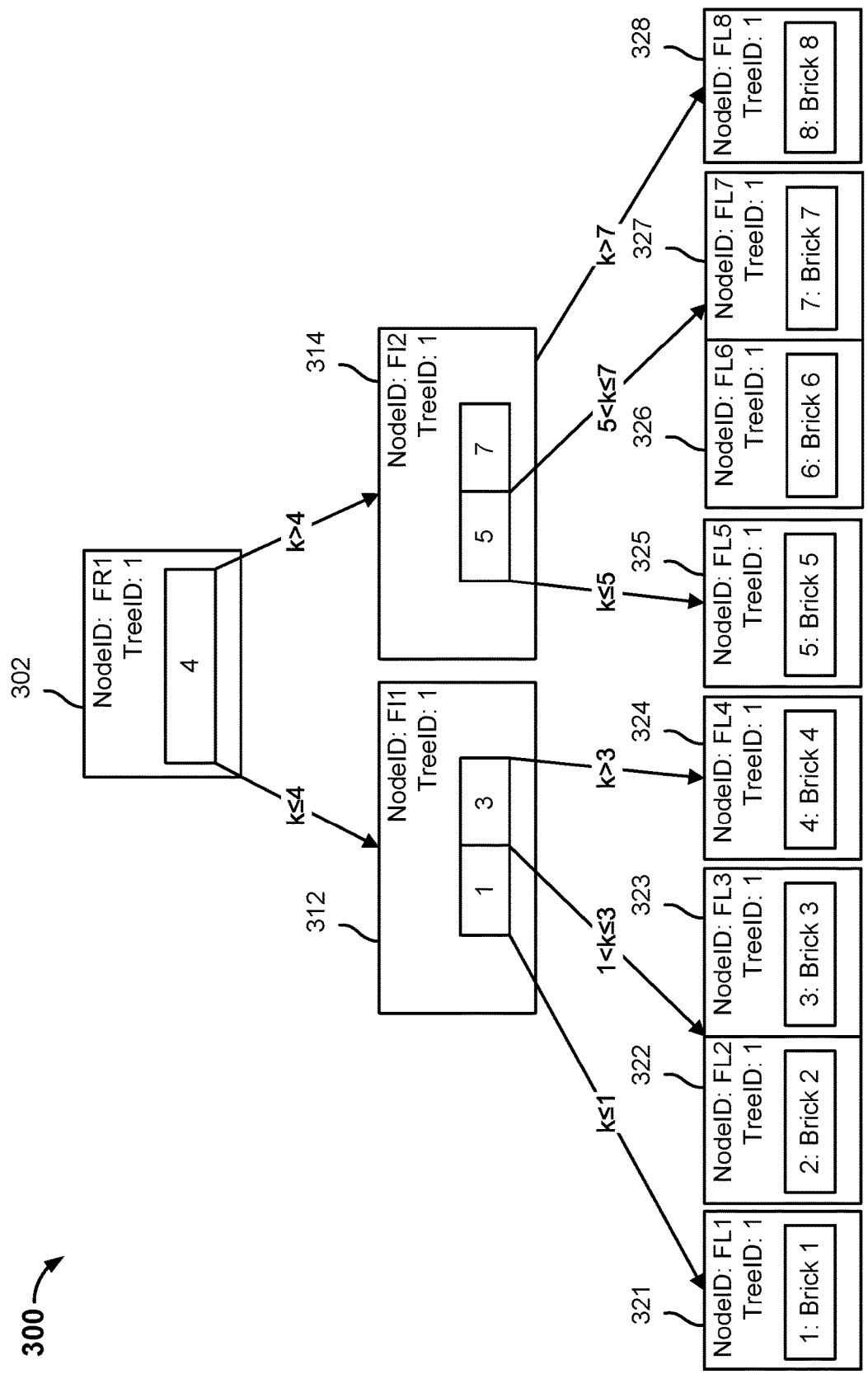
FIG. 3A is a block diagram illustrating an embodiment of a tree data structure.

FIG. 3A is a block diagram illustrating an embodiment of a tree data structure. In some embodiments, tree data structure 300 may be created by a storage system, such as storage system 112. In the example shown, tree data structure 300 corresponds to a content file and stores the file metadata associated with the content file. The file metadata associated with a content file may be stored by a storage system separate from the contents of the file, that is, tree data structure storing the file metadata associated with a content file is stored separately from the contents of the content file. For example, the contents of the file may be stored on a hard disk drive, while tree data structure 300 that holds the file metadata may be stored in storage with faster access times, such as a solid state drive (SSD) of a storage node. A leaf node of a snapshot tree associated with file system data, such as a leaf node of tree data structures 200, 250, 255, may include a pointer to a tree data structure that holds metadata corresponding to a content file, such as tree data structure 300. A tree data structure corresponding to a content file and storing the file metadata associated with the content file (i.e., a "file metadata structure") is a snapshot tree, but is used to organize the data blocks associated with a content file (e.g., data components) that are stored on the storage system. A file metadata structure may be referred to as a file metadata tree.

A tree data structure corresponding to a content file at a particular point in time (e.g., a particular version) may be comprised of a root node, one or more levels of one or more intermediate nodes, and one or more leaf nodes. In some embodiments, a tree data structure corresponding to a content file is comprised of a root node and one or more leaf nodes without any intermediate nodes. Tree data structure 300 may be a snapshot of a content file at a particular point in time t, for example at time $t_0$. Tree data structure 300 may correspond to a full backup of a content file. Tree data structure 300 may correspond to a file metadata structure corresponding to a content file that is less than a size threshold associated with a large content file. Tree data structure 300 may correspond to a component file metadata structure corresponding to a large content file.

In the example shown, tree data structure 300 includes file root node 302, file intermediate nodes 312, 314, and file leaf nodes 321, 322, 323, 324, 325, 326, 327, 328. Similar of the snapshot trees described above, each node includes a "NodeID" that identifies the node and a "TreeID" that identifies a view with which the node is associated (e.g., a version of the content file). Root node 302 includes a pointer to intermediate node 312 and a pointer to intermediate node 314. Root node 202 includes a NodeID of "FR1" and a TreeID of "1."

In the example shown, intermediate node 312 includes respective pointers to leaf nodes 321, 322, 323, 324. Intermediate node 312 includes a NodeID of "FI1" and a TreeID of "1." Intermediate node 312 includes a first node key and a second node key. The data key k for leaf node 321 is a value that is less than or equal to the first node key. The data key for leaf nodes 322, 323 is a value that is greater than the first node key and less than or equal to the second node key. The data key for leaf node 324 is a value that is greater than the second node key. The pointer to leaf node 321 indicates that traversing tree data structure 300 from intermediate node 312 to leaf node 321 will lead to the node with a data key of "1." The pointer to leaf node 322 indicates that traversing tree data structure 300 from intermediate node 312 to leaf node 322 will lead to the node with a data key of "2." The pointer to leaf node 323 indicates that traversing tree data structure 300 from intermediate node 312 to leaf node 323 will lead to the node with a data key of "3." The pointer to leaf node 324 indicates that traversing tree data structure 300 from intermediate node 312 to leaf node 324 will lead to the node with a data key of "4."

In the example shown, intermediate node 314 includes respective pointers to leaf nodes 325, 326, 327, 328. Intermediate node 314 includes a NodeID of "FI2" and a TreeID of "1." Intermediate node 314 includes a first node key and a second node key.

The data key k for leaf node 325 is a value that is less than or equal to the first node key. The data key for leaf nodes 326, 327 is a value that is greater than the first node key and less than or equal to the second node key. The data key for leaf node 328 is a value that is greater than the second node key. The pointer to leaf node 325 indicates that traversing tree data structure 300 from intermediate node 314 to leaf node 325 will lead to the node with a data key of "5." The pointer to leaf node 326 indicates that traversing tree data structure 300 from intermediate node 314 to leaf node 326 will lead to the node with a data key of "6." The pointer to leaf node 327 indicates that traversing tree data structure 300 from intermediate node 314 to leaf node 327 will lead to the node with a data key of "7." The pointer to leaf node 328 indicates that traversing tree data structure 300 from intermediate node 314 to leaf node 328 will lead to the node with a data key of "8."

Leaf node 321 includes a data key-value pair of "1: Brick 1." "Brick 1" is a brick identifier that identifies the data brick associated with one or more data chunks of a content file corresponding to tree data structure 300. Leaf node 321 includes NodeID of "FL1" and a TreeID of "1."

Leaf node 322 includes a data key-value pair of "2: Brick 2." "Brick 2" is a brick identifier that identifies the data brick associated with one or more data chunks of a content file corresponding to tree data structure 300. Leaf node 322 includes NodeID of "FL2" and a TreeID of "1." In this example, both leaf nodes 322, 323 have a key value that is less than or equal to 3 and greater than 1. A file system manager may traverse to leaf node 322 or leaf node 323 based on the corresponding key associated with leaf node 322 and leaf node 323. For example, the file system manager may receive a request to return the value associated with a data key "2." In response to the request, the file system manager may traverse tree data structure 300 to leaf node 322. A file system manager may receive a request to return the value associated with a data key "3." In response to the request, the file system manager may traverse tree data structure 300 to leaf node 323.

Leaf node 323 includes a data key-value pair of "3: Brick 3." "Brick 3" is a brick identifier that identifies the data brick associated with one or more data chunks of a content file corresponding to tree data structure 300. Leaf node 323 includes NodeID of "FL3" and a TreeID of "1."

Leaf node 324 includes a data key-value pair of "4: Brick 4." "Brick 4" is a brick identifier that identifies the data brick associated with one or more data chunks of a content file corresponding to tree data structure 300. Leaf node 324 includes NodeID of "FL4" and a TreeID of "1."

Leaf node 325 includes a data key-value pair of "5: Brick 5." "Brick 5" is a brick identifier that identifies the data brick associated with one or more data chunks of a content file corresponding to tree data structure 300. Leaf node 325 includes NodeID of "FL5" and a TreeID of "1."

Leaf node 326 includes a data key-value pair of "6: Brick 6." "Brick 6" is a brick identifier that identifies the data brick associated with one or more data chunks of a content file corresponding to tree data structure 300. Leaf node 326 includes NodeID of "FL6" and a TreeID of "1." In this example, both leaf nodes 326, 327 have a key value that is less than or equal to 7 and greater than 5. A file system manager may traverse tree data structure 300 to leaf node 326 or leaf node 327 based on the corresponding key associated with leaf node 326 and leaf node 327. For example, the file system manager may receive a request to return the value associated with a data key "6." In response to the request, the file system manager may traverse tree data structure 300 to leaf node 326. The file system manager may receive a request to return the value associated with a data key "7." In response to the request, the file system manager may traverse tree data structure 300 to leaf node 327.

Leaf node 327 includes a data key-value pair of "7: Brick 7." "Brick 7" is a brick identifier that identifies the data brick associated with one or more data chunks of a content file corresponding to tree data structure 300. Leaf node 327 includes NodeID of "FL7" and a TreeID of "1."

Leaf node 328 includes a data key-value pair of "8: Brick 8." "Brick 8" is a brick identifier that identifies the data brick associated with one or more data chunks of a content file corresponding to tree data structure 300. Leaf node 328 includes NodeID of "FL8" and a TreeID of "1."

A content file may be comprised of a plurality of data chunks. A brick may be associated with one or more data chunks. In the example shown, leaf nodes 321, 322, 323, 324, 325, 326, 327, 328 each store a corresponding brick identifier. A metadata store, such as metadata store 114, may include one or more data structures that associate a brick identifier with a corresponding location (physical location) of the one or more data chunks associated with the data brick. For example, a metadata store may store a first data structure (e.g., chunk metadata table) that is configured to associate brick identifiers with chunk identifiers and chunk file identifiers. The metadata store may store a second data structure (e.g., chunk file metadata table) that associates a chunk file identifier with a chunk file storing a plurality of data chunks. In some embodiments, the first data structure and the second data structure are combined as a single data structure. The one or more data chunks associated with a data brick may be located based on the chunk metadata table and the chunk file metadata table. For example, a first data brick having a first brick identifier may be associated with a first chunk identifier (e.g., SHA-1 hash value). The first chunk identifier may be used in conjunction with the chunk metadata table to identify a chunk file identifier. A chunk file having the identified chunk file identifier is comprised of a plurality of data chunks. The chunk file metadata table may be used to identify a location of the plurality of data chunks. The chunk file metadata table may include offset information of the plurality of data chunks within a chunk file.

A data brick may have a particular brick capacity (e.g., 256 kB). The brick capacity indicates a size of one or more data chunks to which the data brick may be associated. In some embodiments, a data brick is associated with a full capacity (e.g., 256 kB) of one or more data chunks. In some embodiments, a data brick is associated with less than a full capacity of one or more data chunks. Tree data structure 300 may correspond to the last portion of the plurality of portions associated with a large content file. "Brick 8" of leaf node 328 may not be brick aligned. A content file is brick aligned in the event the last brick of the component file metadata structure associated with the last portion of the content file, is at full capacity. A content file is not brick aligned in the event the last brick of the component file metadata structure associated with the last portion of the content file, is not at full capacity. In the event "Brick 8" is not brick aligned, the unused portion of "Brick 8" may be reserved for the content file corresponding to tree data structure 300 such that "Brick 8" does not store information that corresponds to one or more data chunks associated with a different content file. For example, "Brick 8" of a content file associated with tree data structure 300 may be associated with 150 kB of data chunks. The size of the "Brick 8" may 256 kB. 100 kB of "Brick 8" is not associated with any data chunks. Instead of using the 100 kB of "Brick 8" for one or more data chunks associated with a second content file, the last 100 kB of "Brick 8" may be reserved for the content file associated with tree data structure 300. The one or more data chunks associated with the second content file may be associated with one or more other data bricks that are separate from the data bricks associated with the content file associated with tree data structure 300, that is, in some embodiments, a data brick is not configured to be associated with multiple content files. For example, a content file may have a size of 7.9 MB. The last brick of the file metadata structure corresponding to the content file may be associated with a file offset of 7.7-7.9 MB. Instead of a first data brick associated with a second file having a starting file offset at 7.9 MB, the file offset associated with the last data brick may be extended from 7.9 MB to 8.0 MB (e.g., the last 100 kB is reserved for the first content file) such that the first data brick associated with the second file has a starting file offset of 8.0 MB, i.e., the file offsets associated with a content file are brick aligned.

Figure 3B:
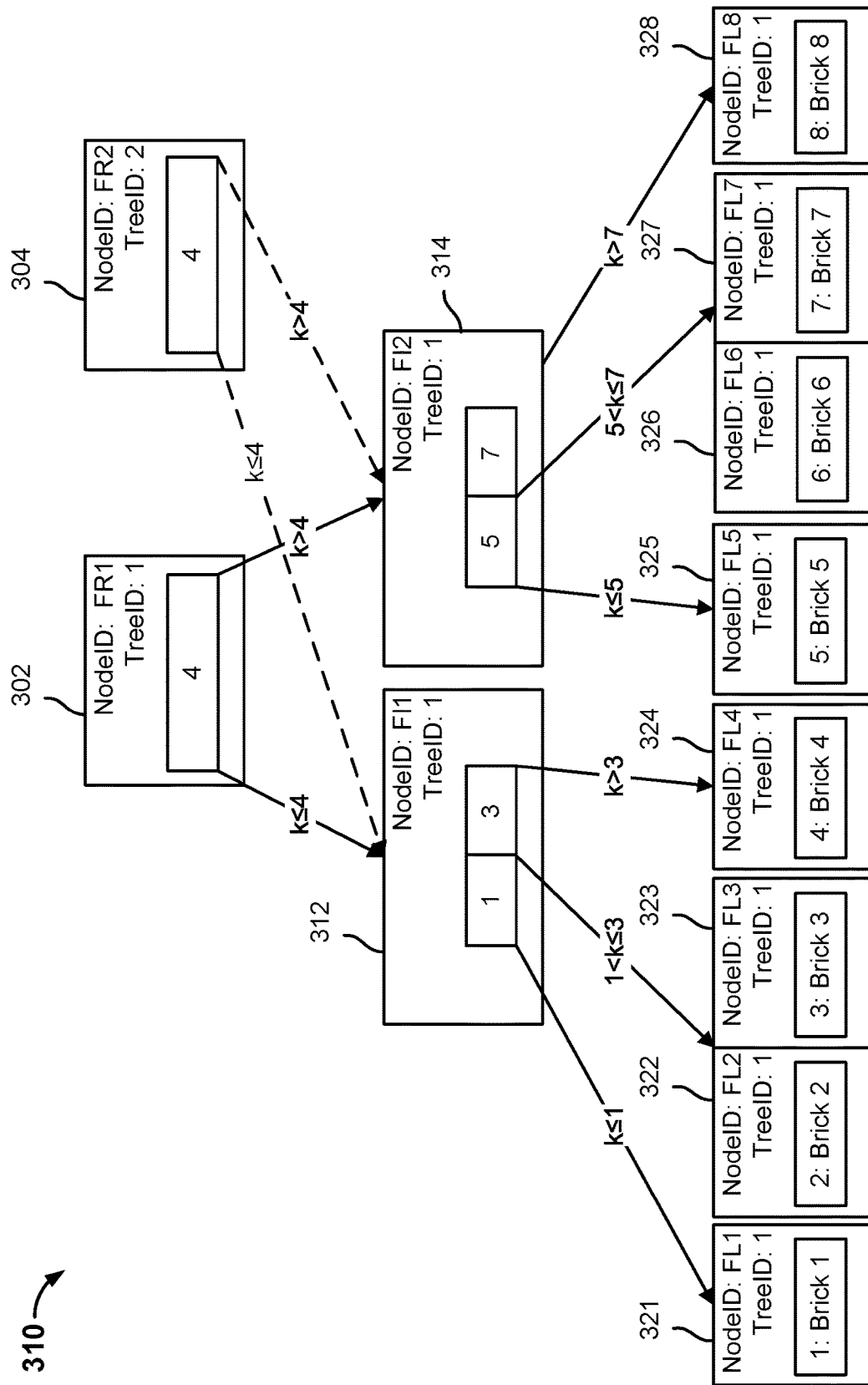
FIG. 3B is a block diagram illustrating an embodiment of a cloned file metadata structure.

FIG. 3B is a block diagram illustrating an embodiment of a cloned file metadata structure. A file metadata structure may be cloned when a subsequent version of the content file is stored on a storage system. In some embodiments, tree data structure 310 may be created by a storage system, such as storage system 112. A tree data structure corresponding to a content file is a snapshot tree, but stores file metadata associated with the content file. The tree data structure corresponding to a content file can be used to capture different versions of a content file at different moments in time. In some embodiments, the tree data structure allows a chain of file metadata structures corresponding to different versions of a content file to be linked together by allowing a node of a later version of a file metadata structure to reference a node of a previous version of a file metadata structure. The file metadata structure corresponding to a subsequent version of the content file may be generated in part by cloning the file metadata structure corresponding to a previous version of the content file. In some embodiments, tree data structure 310 corresponds to a cloned component file metadata structure.

A root node or an intermediate node of a version of a file metadata structure may reference an intermediate node or a leaf node of a previous version of a file metadata structure. Similar to the snapshot tree structure, the file metadata structure allows different versions of a content file to share nodes and allows changes to a content file to be tracked. When a backup snapshot is received, a root node of the file metadata structure may be linked to one or more intermediate nodes associated with a previous file metadata structure. This may occur when the content file is included in both backup snapshots.

In the example shown, tree data structure 310 includes a first file metadata structure comprising root node 302, intermediate nodes 312, 314, and leaf nodes 321, 322, 323, 324, 325, 326, 327, 328. Tree data structure 310 also includes a second file metadata structure that may be a snapshot of file data at a particular point in time, for example at time $t_1$. The second file metadata structure is comprised of root node 304, intermediate nodes 312, 314, and leaf nodes 321, 322, 323, 324, 325, 326, 327, 328. To create a snapshot of the file data at time a new root node is created by cloning the previous root node. The cloned root node includes the same set of pointers as the previous root node, but includes a different NodeID and a different TreeID. In the example shown, root node 304 includes a set of pointers to intermediate nodes 312, 314, which are intermediate nodes associated with a previous snapshot. The TreeID is the view identifier associated with a view of the file metadata structure at a particular moment in time. The TreeID of a root node indicates a view with which the root node is associated (e.g., content file version). For example, root node 302 with a TreeID of "1" is associated with a first backup snapshot and root node 304 with a TreeID of "2" is associated with a second backup snapshot.

In the example shown, root node 304 is a clone (i.e., a copy) of root node 302. Similar to root node 302, root node 304 includes the same pointers as root node 302. Root node 304 includes a first set of pointers to intermediate node 312. The first set of pointers associated with a data key (e.g., "1," "2," "3," or "4") less than or equal the node key indicates that traversing a file metadata structure included in tree data structure 310 from root node 304 to intermediate node 312 leads to a leaf node with a data key of "1," "2," "3," or "4." Root node 304 includes a second set of pointers to intermediate node 314. The second set of pointers associated with a data key greater than the node key indicates that traversing a file metadata structure included in tree data structure 310 from root node 304 to intermediate node 314 leads to a leaf node with a data key of "5," "6," "7," or "8." Root node 304 includes a NodeID of "FR2" and a TreeID of "2."

Figure 3C:
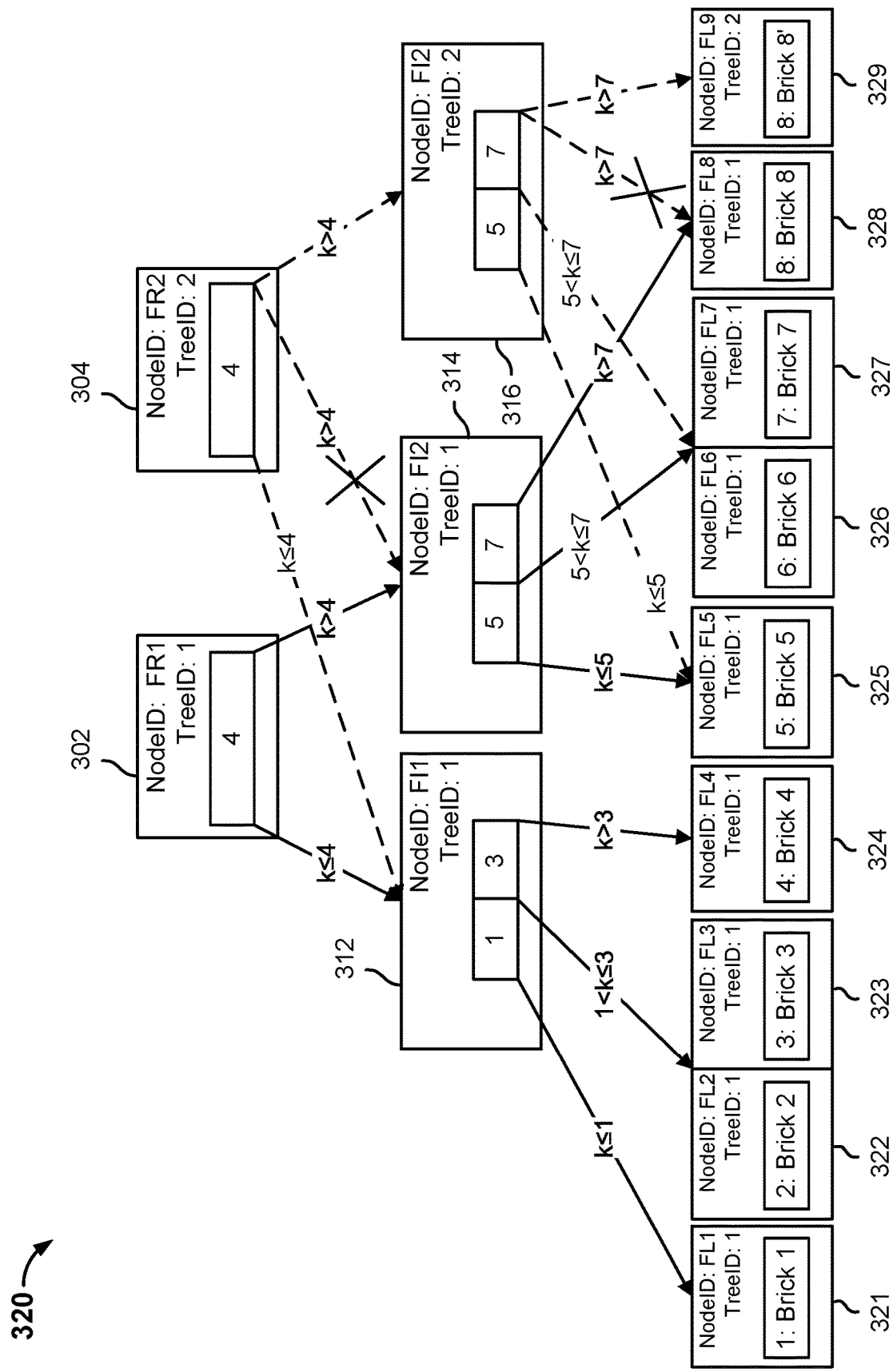
FIG. 3C is a block diagram illustrating an embodiment of modifying a cloned file metadata structure.

FIG. 3C is a block diagram illustrating an embodiment of modifying a cloned file metadata structure. Tree data structure 320 is comprised of a first file metadata structure that includes root node 302 and a second file metadata structure that includes root node 304. In the example shown, tree data structure 320 may be modified by a file system manager, such as file system manager 115. In some embodiments, tree data structure 320 is comprised of a first component file metadata structure that includes root node 302 and a second component file metadata structure that includes root node 304. For example, the first component file metadata structure corresponds to a first version of a first portion of a large content file and the second component file metadata structure corresponds to a second version of the first portion of the large content file.

In some embodiments, the file data associated with a content file may be modified such that one of the data chunks is replaced by another data chunk. When a data chunk of file data associated with a previous backup snapshot is replaced with a new data chunk, the data brick associated with the new data chunk may be different. A leaf node of a file metadata structure stores a brick identifier of a data brick that is associated with a data chunk. To represent this modification to the file data, a corresponding modification is made to a current view of a file metadata structure. The current view of the file metadata structure is modified because the previous file metadata structure is a snapshot view and can no longer be modified. The data chunk of the file data that was replaced has a corresponding leaf node in the previous file metadata structure. A new leaf node in the current view of the file metadata structure is created, as described herein, that corresponds to the new data chunk. The new leaf node includes an identifier associated with the current view. The new leaf node may also store the chunk identifier associated with the modified data chunk.

In the example shown, a data chunk included in "Brick 8" has been modified. The data chunk included in "Brick 8" has been replaced with a data chunk included in "Brick 8'." At $t_1$, the file system manager starts at root node 304 because that is the root node associated with the file metadata structure at time $t_2$. The value "Brick 8" is associated with the data key "8." The file system manager traverses tree data structure 320 from root node 304 until it reaches a target node, in this example, leaf node 328. The file system manager compares the TreeID at each intermediate node and leaf node with the TreeID of the root node. In the event the TreeID of a node matches the TreeID of the root node, the file system manager proceeds to the next node. In the event the TreeID of a node does not match the TreeID of the root node, a shadow copy of the node with the non-matching TreeID is made. A shadow copy is a copy of a node and includes the same pointers as the copied node, but includes a different NodeID and TreeID. For example, to reach a leaf node with a data key of "8," the file system manager begins at root node 304 and proceeds to intermediate node 314. The file system manager compares the TreeID of intermediate node 314 with the TreeID of root node 304, determines that the TreeID of intermediate node 314 does not match the TreeID of root node 304, and creates a copy of intermediate node 314. The intermediate node copy 316 includes the same set of pointers as intermediate node 314, but includes a TreeID of "2" to match the TreeID of root node 304. The file system manager updates a pointer of root node 304 to point to intermediate node 316 instead of pointing to intermediate node 314. The file system manager traverses tree data structure 320 from intermediate node 316 to leaf node 328, determines that the TreeID of leaf node 328 does not match the TreeID of root node 304, and creates a copy of leaf node 328. Leaf node 329 is a copy of leaf node 328, but stores the brick identifier "Brick 8'" and includes the same TreeID as root node 304. The file system manager updates a pointer of intermediate node 316 to point to leaf node 329 instead of pointing to leaf node 328. In some embodiments, a read lock for a directory inode associated with the large content file associated with tree data structure 320 is obtained by a storage node and a write lock associated with a file inode associated with the large content file associated with tree data structure 320 is obtained.

Figure 3D:
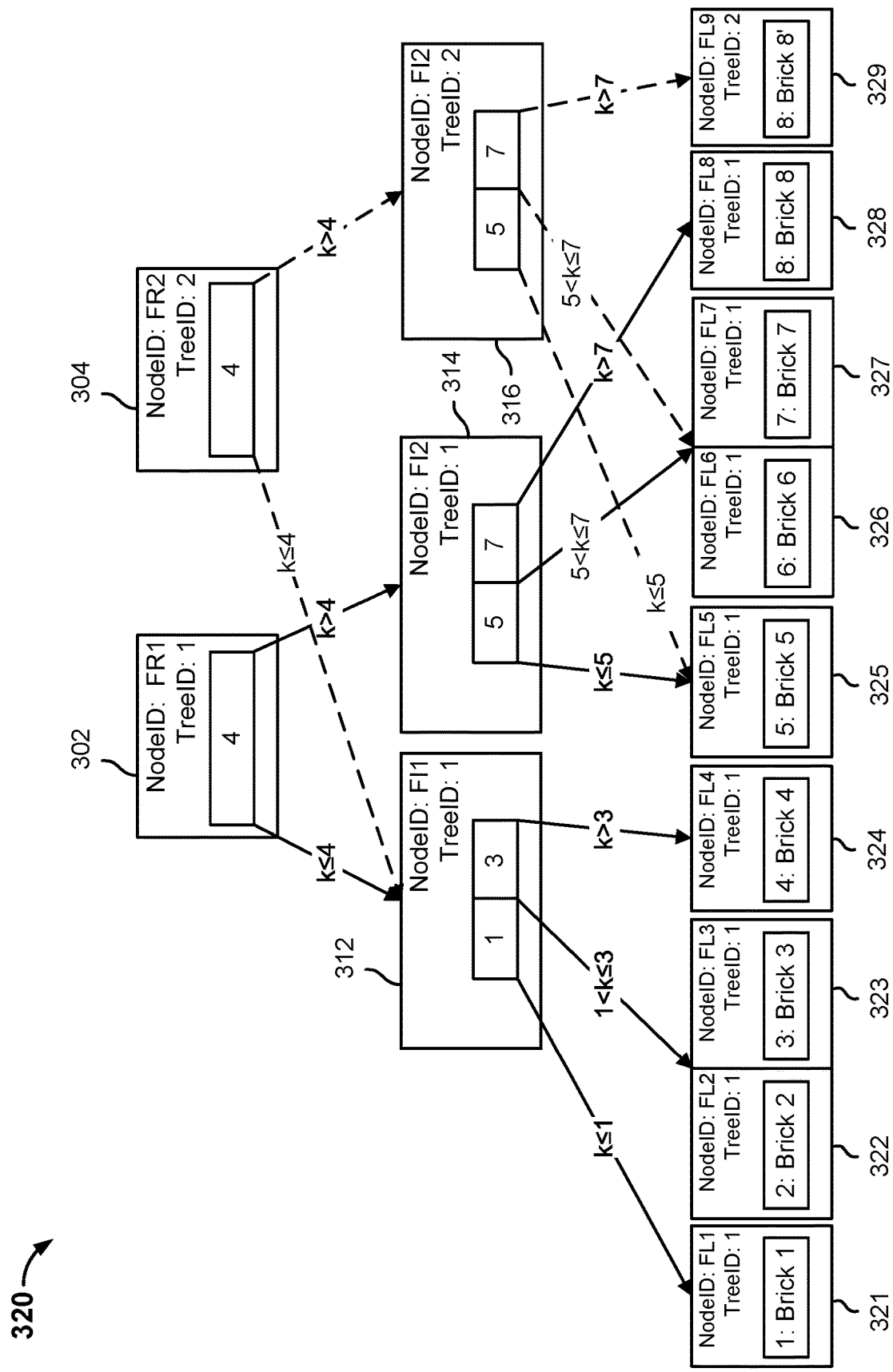
FIG. 3D is a block diagram illustrating an embodiment of a modified file metadata structure.

FIG. 3D is a block diagram illustrating an embodiment of a modified file metadata structure. The tree data structure 320 shown in FIG. 3D illustrates a result of the modifications made to tree data structure 310 as described with respect to FIG. 3C.

Figure 4A:
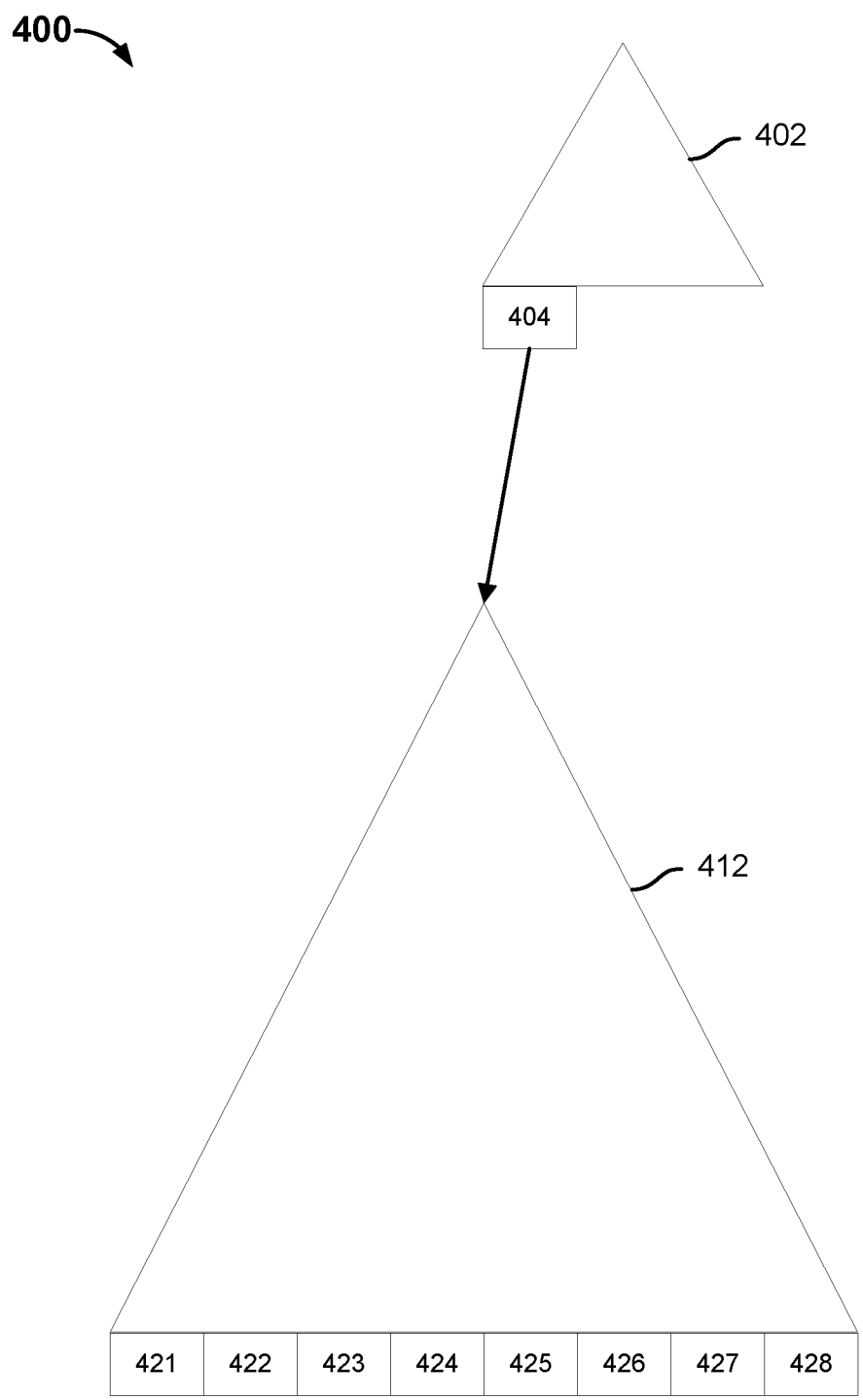
FIG. 4A is a block diagram illustrating an embodiment of a view of file system data.

FIG. 4A is a block diagram illustrating an embodiment of a view of file system data. In the example shown, file system data view 400 may be generated by a file system manager, such as file system manager 115. File system data view 400 may correspond to a backup snapshot of file system data. File system data view 400 includes a snapshot tree 402 and file metadata structure 412.

Snapshot tree 402 includes leaf node 404. Snapshot tree 402 may include other leaf nodes that are not shown for explanation purposes. Leaf node 404 includes a pointer to a root node associated with file metadata structure 412. Leaf node 404 may have store an id associated with a content file with which it is associated (e.g., inode id).

File metadata structure 412 may correspond to a content file and stores the file metadata associated with the content file. The content file associated with file metadata structure 412 includes a plurality of data bricks associated with a plurality of data chunks. File metadata structure 412 includes leaf nodes 421, 422, 423, 424, 425, 426, 427, 428.

A leaf node may be configured to store a value of a brick identifier that is associated with one or more data chunks of the content file. For example, leaf node 421 may be configured to store a brick identifier associated with a first subset of data chunks of the content file, leaf node 422 may be configured to store a brick identifier associated with a second subset of data chunks of the content file, leaf node 423 may be configured to store a brick identifier associated with a third subset of data chunks of the content file, leaf node 424 may be configured to store a brick identifier associated with a fourth subset of data chunks of the content file, leaf node 425 may be configured to store a brick identifier associated with a fifth subset of data chunks of the content file, leaf node 426 may be configured to store a brick identifier associated with a sixth subset of data chunks of the content file, leaf node 427 may be configured to store a brick identifier associated with a seventh subset of data chunks of the content file, and leaf node 428 may be configured to store a brick identifier associated with an eight subset of data chunks of the content file.

Figure 4B:
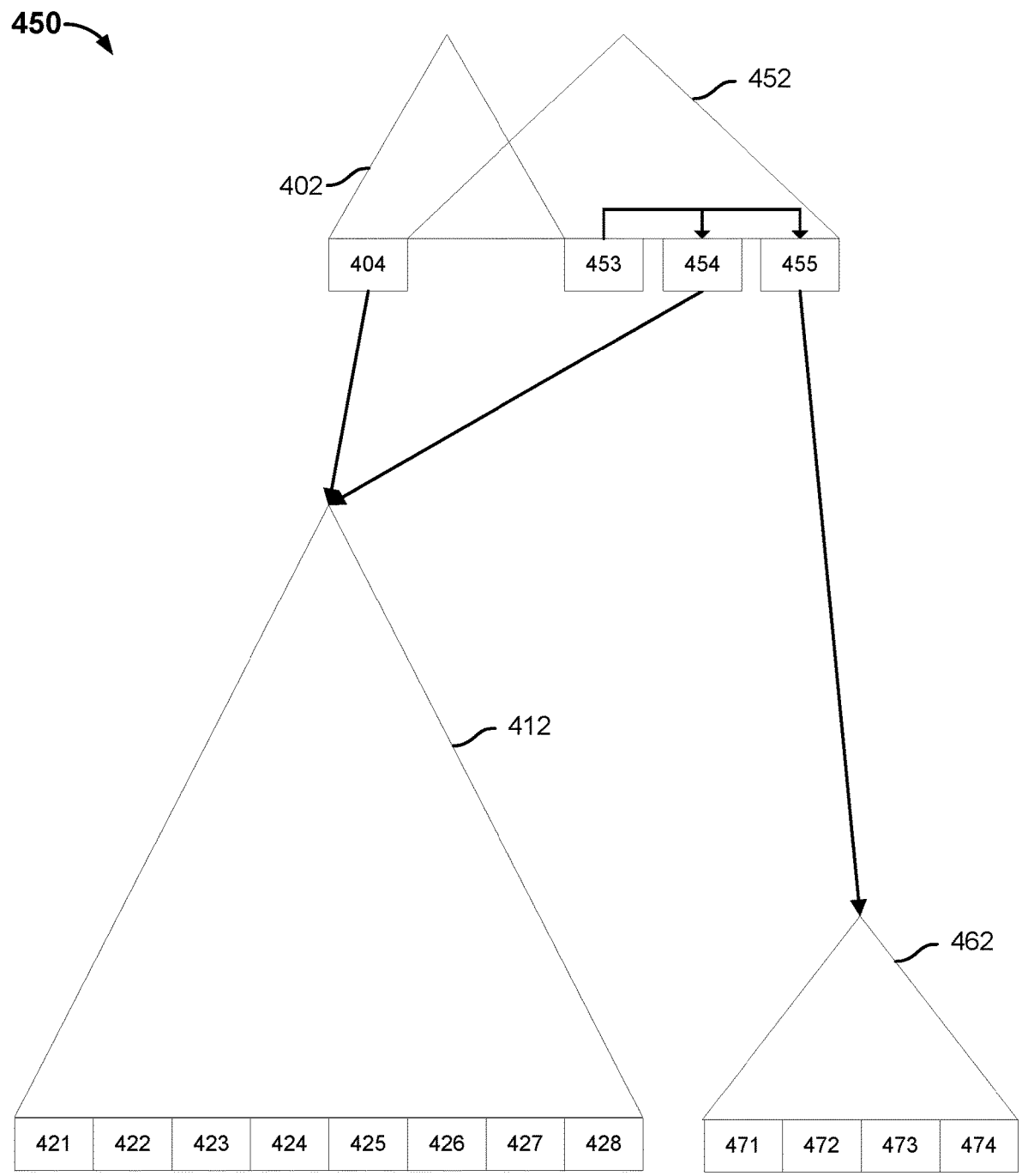
FIG. 4B is a block diagram illustrating an embodiment of a view of file system data.

FIG. 4B is a block diagram illustrating an embodiment of a view of file system data. A primary system may perform an incremental backup snapshot and send data associated with a content file to a storage system. Prior to the incremental backup snapshot, a size of the content file may be less than a threshold size associated with a large content file. After the incremental backup snapshot, the size of the content file may be greater than the threshold size associated with the large content file. A file system manager, such as file system manager 115 may generate a view of the primary system, such that the metadata associated with the large content file is stored across a plurality of component file metadata structures. A component file metadata structure is similar to a file metadata structure, but is configured to store file metadata associated with a portion of a content file instead of storing file metadata associated with an entire content file.

File system data view 450 is comprised of snapshot tree 452 and component file metadata structures 412, 462. In the example shown, file metadata structure 412 has become component file metadata structure 412 because the content file associated with file metadata structure 412 has become a large content file. File system data view 400 is shown alongside file system data view 450 for explanation purposes. In the example shown, file system data view 450 may be generated by a file system manager, such as file system manager 115. File system data view 450 may be generated in the event a size associated with a content file is greater than a threshold size.

Snapshot tree 452 includes leaf nodes 453, 454, 455. Leaf node 454 is a modified version of leaf node 404, that is, the value stored by leaf node 404 has been modified to the value stored by leaf node 454. Snapshot tree 452 may include other leaf nodes that are not shown for explanation purposes. Leaf node 404 may store an identifier of the content file associated with file metadata structure 412. For example, the identifier may be an inode id. Leaf node 453 may also store the identifier of the content file associated with file metadata structure 412, but also store additional information. For example, leaf node 453 may be a directory inode and store information that indicates which component file metadata structure is associated with which portion of the large content file.

In some embodiments, leaf node 453 stores a first vector that indicates a size of the large content file data that is associated with a component file metadata structure. For example, leaf node 453 may store the vector $\{1, 10, \ldots, 50\}$. In some embodiments, the size of the large content file data is the same for a plurality of sequential file metadata structures associated with the large content file. For example, a large content file may be comprised of a first part with a size of 1 MB, a second part with a size of 10 MB, a third part with a size of 10 MB, a fourth part with a size of 10 MB, . . . , and an nth part with a size of 50 MB. The leaf node may store the vector $\{1, 10, 10, 10, \ldots 50\}$. Leaf node 453 may store a second vector that indicates a number of file metadata structures with the same size. For example, the leaf node may store the vector $\{1, 3, \ldots, 1\}$. Instead of storing the first vector of $\{1, 10, 10, 10, 10, \ldots 50\}$, leaf node 453 may store the first vector as $\{1, 10, \ldots 50\}$. The combination of the first and second vector may reduce the amount of information stored by leaf node 453 because instead of storing the size associated with each component file metadata structure associated with a large content file, the size information may be condensed in the event a plurality of sequential component file metadata structures are associated with a same size of large content file data. When trying to perform a file system operation with respect to a large content file, a file system manager may use the information stored by leaf node 453 to perform the file system operation.

Leaf node 453 may store corresponding pointers to each of the leaf nodes (e.g., leaf nodes 454, 455) that include corresponding pointers to the component file metadata structures associated with the large content file. Leaf nodes 454, 455 may be file inodes. Leaf node 454 may store a pointer that references component file metadata structure 412 and leaf node 455 may store a pointer that references component file metadata structure 462.

A component file metadata structure corresponding to a content file may store a portion of the file metadata associated with the content file and is used to organize the data blocks associated with the portion of the content file (e.g., data components) that are stored on the storage system. Component file metadata structure 412 may be associated with a first portion of the large content file and component file metadata structure 462 may be associated with a second portion of the large content file.

Component file metadata structure 412 may be configured to store the file metadata associated with the content file prior to the content file being a large content file. Component file metadata structure 462 may be configured to store the file metadata associated with the content file after the content file becomes a large content file. Component file metadata structure 462 includes leaf nodes 471, 472, 473, 474. Leaf nodes 471, 472, 473, 474 may store corresponding brick identifiers associated with one or more data chunks of the large content file.

Storing the file metadata associated with a large content file may reduce the amount of time needed to update the file metadata associated with the large content file. A first storage node may obtain a write lock associated with component file metadata structure 412 (e.g., a write lock for leaf node 454) and a second storage node may obtain a write lock associated with component file metadata structure 462 (e.g., a write lock for leaf node 455). The first and second storage nodes may update their respective component file metadata structures in parallel. In contrast, in the event the file metadata associated with component file metadata structures 412, 462 were included in a single file metadata structure, then only a single storage node may update the single file metadata structure.

Figure 4C:
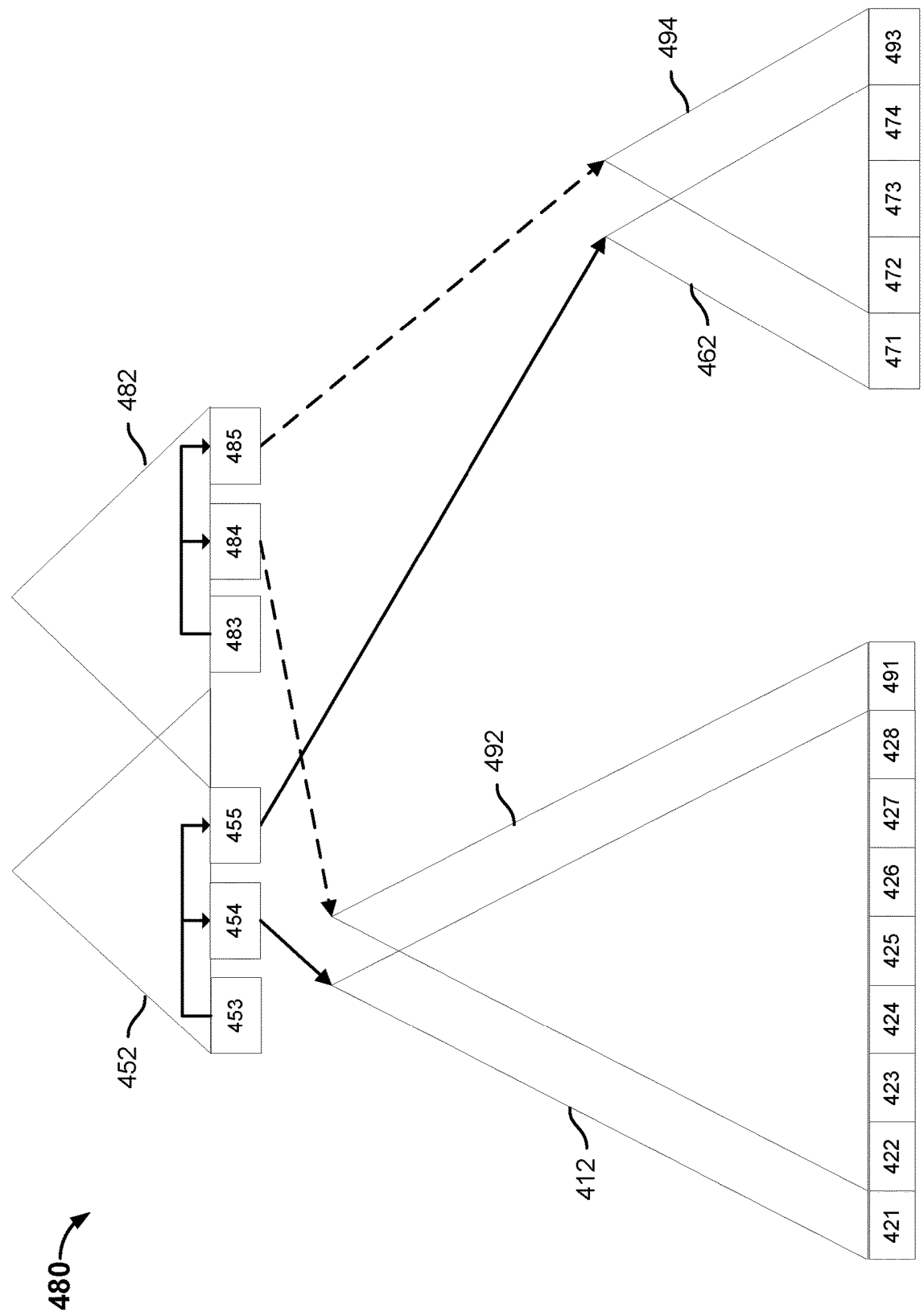
FIG. 4C is a block diagram illustrating an embodiment of a view of file system data.

FIG. 4C is a block diagram illustrating an embodiment of a view of file system data. In the example shown, file system data view 480 may be generated by a file system manager, such as file system manager 115. File system data view 480 may be generated in the event a large content file has been modified. For example, a storage system may receive an incremental backup snapshot that includes data that modifies a large content file.

File system data view 480 includes snapshot tree 482 and component file metadata structures 492, 494. File system data view 450 is shown alongside file system data view 480 for explanation purposes. File system data view 450 is comprised of snapshot tree 452 and component file metadata structures 412, 462. Component file metadata structures 412, 462 may store the file metadata associated with a large content file. Component file metadata structure 412 may store the file metadata associated with the large content file prior to the content file becoming a large content file. Component file metadata structure 462 may store the file metadata associated with the large content file after the content file became a large content file.

Snapshot tree 482 includes leaf nodes 483, 484, 485. Snapshot tree 482 may include other leaf nodes that are not shown for explanation purposes. Leaf node 483 may be a modified version of leaf node 453. Leaf node 483 may store the same inode id as leaf node 453, but store updated component file metadata structure information. For example, the size of a portion of a large content file may have increased. The file metadata structure information may be updated to reflect the increase. Leaf node 483 may store corresponding pointers to each of the leaf nodes (e.g., leaf nodes 484, 485) that include corresponding pointers to the modified component file metadata structures associated with the large content file. Component file metadata structures 492, 494 may store the file metadata associated with a modified large content file.

Component file metadata structure 492 may correspond to the previously stored portion of the file metadata associated with the content file prior to the content file becoming a large content file. Component file metadata structure 492 may store any changes to the previously stored portion of the file metadata associated with the content file prior to the content file becoming a large content file. In the example shown, the data associated with leaf node 421 has been modified to become the data associated with leaf node 491. Component file metadata structure 492 has an associated "TreeID."

Component file metadata structure 494 may correspond to the new portion of the file metadata associated with the content file after the content file became a large content file. Component file metadata structure 494 may be configured to store any changes to the new portion of the file metadata associated with the content file after the content file became a large content file. In the example shown, the data associated with leaf node 471 has been modified to become the data associated with leaf node 493. The metadata associated with any new data that is added to the content file may be included in component file metadata structure 494 and is not included in component file metadata structure 492. Component file metadata structure 494 may also have an associated "TreeID."

Leaf node 484 may include a pointer to component file metadata structure 492 and leaf node 485 may include a pointer to component file metadata structure 494. Leaf node 483 may store information (i.e., a data structure) that indicates which component file metadata structure is associated with which portion of the large content file. The data structure may associate a file offset of the large content file with a component file metadata structure. For example, a threshold size for a large content file may be 64 GB and a content file may have a size of 64 GB before the content file became a large content file. The content file may have a size of 100 GB after the content file became a large content file. Component file metadata structure 492 may be associated with a file offset of 0-64 GB and component file metadata structure 494 may be associated with a file offset of 64 GB-100 GB. The data structure may indicate that a file offset of 0-64 GB of the large content file is associated with the component file metadata structure 492 and a file offset of 64 GB-100 GB of the large content file is associated with component file metadata structure 494.

The data structure may also indicate the range of data keys associated with the different file offsets. For example, data keys 0-100 k may be associated with the file offset of 0-64 GB and data keys 101 k-200 k may be associated with the file offset of 64 GB-100 GB.

In some embodiments, leaf node 483 stores a first vector that indicates a size of the large content file data that is associated with a component file metadata structure. For example, the leaf node may store the vector $\{1, 10, \ldots, 50\}$. In some embodiments, the size of the large content file data is the same for a plurality of sequential component file metadata structures associated with the large content file. For example, a large content file may be comprised of a first part with a size of 1 MB, a second part with a size of 10 MB, a third part with a size of 10 MB, a fourth part with a size of 10 MB, . . . , and an nth part with a size of 50 MB. Leaf node 483 may store a second vector that indicates a number of sequential component file metadata structures with the same size. For example, the leaf node may store the vector $\{1, 3, \ldots, 1\}$. This may reduce the amount of information stored by the leaf node because instead of storing the size associated with each component file metadata structure associated with a large content file, the size information may be condensed in the event a plurality of sequential component file metadata structures are associated with a same size of large content file data. When trying to perform a file system operation with respect to a large content file, a file system manager may use the information stored by the leaf node to perform the file system operation.

Figure 5:
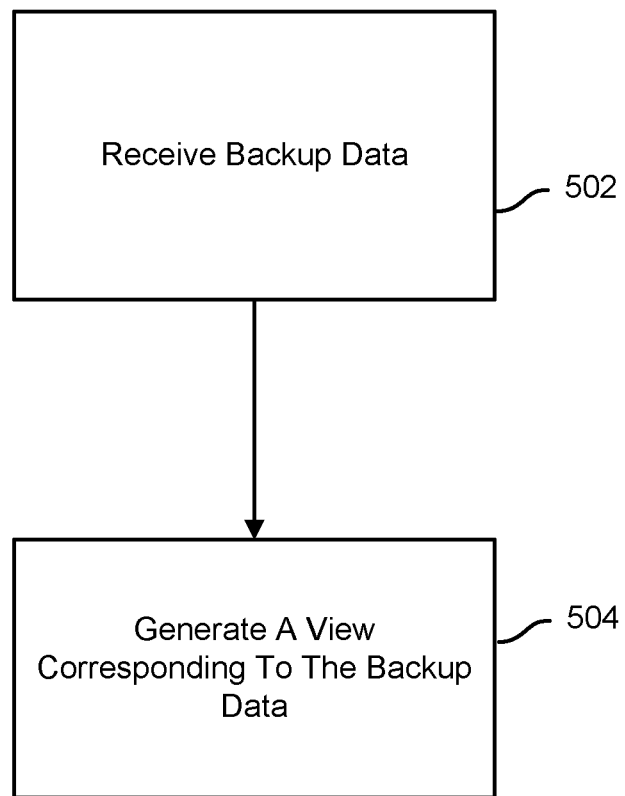
FIG. 5 is a flow chart illustrating an embodiment of a process for performing a backup.

FIG. 5 is a flow chart illustrating an embodiment of a process for performing a backup. In the example shown, process 800 may be implemented by a storage system, such as storage system 112.

At 502, backup data is received. In some embodiments, backup data is included in a full backup snapshot of a primary system. In some embodiments, backup data is included in an incremental backup snapshot of the primary system.

The backup data may include file system data associated with the primary system. In the event a full backup snapshot of the primary system was performed, the backup data includes all of the file system data associated with the primary system. In the event an incremental backup snapshot of the primary system was performed, the backup data includes the file system data associated with the primary system that was not previously backed up. The file system data may include file data associated with a content file.

At 504, a view corresponding to the backup data is generated. The view may be comprised of a snapshot tree and one or more file metadata structures. A file metadata structure may correspond to one of the content files of the primary system. A snapshot tree may include a leaf node that is associated with one or more file metadata structures.

A full backup snapshot of the primary system may include data associated with one or more content files. In some embodiments, the size of a content file is less than or equal to a threshold size associated with a large content file. In the event the size of the content file is less than or equal to the threshold size associated with the large content file, a corresponding file metadata structure may be generated for the content file. The corresponding file metadata structure is configured to store the file metadata associated with the content file. In some embodiments, the size of the content file is greater than the threshold size associated with the large content file. In the event the size of the content file is greater than the threshold size associated with the large content file, a plurality of component file metadata structures may be generated for the content file. Each of the plurality of component file metadata structures is configured to store the file metadata associated with a corresponding portion of the content file.

An incremental backup snapshot of the primary system may include data associated with one or more content files that was not previously backed up. In some embodiments, the incremental backup snapshot includes data for a content file that was previously not considered to be a large content file. The data may cause the content file to become a large content file. A component file metadata structure may be generated for the data that caused the content file to become a large content file. A component file metadata structure for the previously stored portion of the content file may already be stored by the storage system. In some embodiments, the incremental backup snapshot includes content file data for a content file that was not previously stored. One or more file metadata structures may be generated for content file as described above with respect to the full backup snapshot.

Figure 6A:
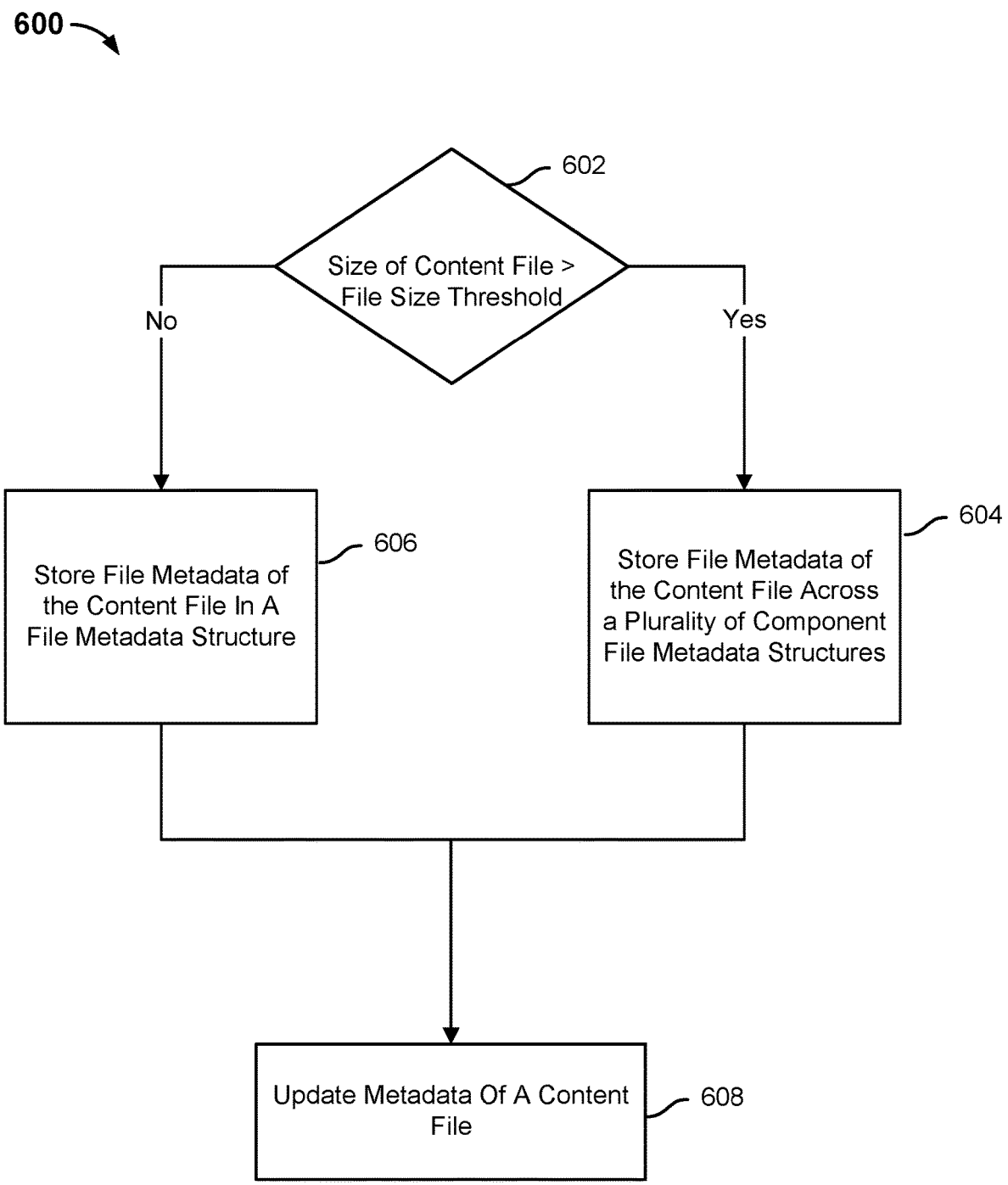
FIG. 6A is a flow chart illustrating an embodiment of a process for generating a view of file system data.

FIG. 6A is a flow chart illustrating an embodiment of a process for generating a view of file system data. In the example shown, process 600 may be implemented by a storage system, such as storage system 112. In some embodiments, process 600 is implemented to perform some or all of step 504 of process 500. In some embodiments, process 600 is implemented to perform some or all of steps 806, 808 of process 800.

At 602, it is determined whether a size of a content file is greater than a threshold size. A backup snapshot comprising file system data is received. The file system data includes a plurality of content files. At least one of the content files may be determined to be a large content file. A large content file is a content file with a size that is greater than a threshold size (e.g., 100 TB). In some embodiments, the size of a content file may be determined based on the data associated with a content file received with the received backup snapshot. The received backup snapshot includes at least a portion of the content file. The size of the content file may be determined to be greater than the threshold size based on a plurality of data chunks of the content file included in a received backup snapshot. In other embodiments, a user associated with the backup snapshot indicates that a content file is a large content file.

In the event the size of the content file is determined to be greater than the threshold size, process 600 proceeds to 604. In the event the size of the content file is determined not to be greater than the threshold size, process 600 proceeds to 606.

At 604, the file metadata of the content file is stored across a plurality of component file metadata structures. A file system manager may generate a view of the file system data corresponding to the backup snapshot. The view may be comprised of a snapshot tree and a plurality of file metadata structures corresponding to the plurality of content files associated with the file system data. A plurality of component file metadata structures for file metadata associated with a content file may be generated for a content file that is greater than the threshold size (e.g., a large content file). Each of the component file metadata structures is configured to store a corresponding portion of file metadata associated with the content file. Each component file metadata structure may be associated with a corresponding file offset of the large content file. Each of the component file metadata structure may be associated with a pre-allocated size of the content file (e.g., 16 GB).

In some embodiments, the plurality of component file metadata structures corresponding to the large content file correspond to equal portions of the large content file data. For example, the large content file may be split into equal portion sizes and a corresponding file metadata structure may be generated for each of portion of the large content file. For example, a large content file may have a size of 1 TB. Ten component file metadata structures may be generated for the large content file where each component file metadata structure is associated with 10 GB of the large content file. A first component file metadata structure may store file metadata associated with large content file data having a file offset of 0-10 GB, a second component file metadata structure may store file metadata associated with large content file data having a file offset of 10 GB-20 GB, . . . , a tenth component file metadata structure may store file metadata associated with large content file data having a file offset of 90 GB-100 GB.

In some embodiments, the plurality of component file metadata structures corresponding to the large content file correspond to different portion sizes of the large content file. For example, a large content file may be backed up in a plurality of portions (e.g., uploaded to an object store (cloud storage) in a plurality of portions). A corresponding component file metadata structure may be generated for each of the plurality of portions. Some of the portions of the large content file may have the same size and some portions of the large content file may have different sizes. In some embodiments, each of the different portions of the large content file have different sizes.

At 606, the file metadata of the content file is stored in a file metadata structure. A file system manager may generate a view of the file system data corresponding to the backup snapshot. The view may be comprised of a snapshot tree and a plurality of file metadata structures corresponding to the plurality of content files associated with the file system data. A single file metadata structure for metadata associated with a content file may be generated for a content file that is less than or equal to the threshold size.

At 608, the metadata of a content file is updated. The metadata of a content file may be stored in a journal, a snapshot tree, a list, a data structure, etc. In some embodiments, the snapshot tree is updated to reference the plurality of component file metadata structures associated with the content file (e.g., when the size of the content file is greater than the file size threshold.). The snapshot tree may be updated to include a leaf node (e.g., directory inode) that is configured to store information that indicates which component file metadata structure is associated with which portion of the large content file. The directory inode may store corresponding pointers to each of the leaf nodes (e.g., file inodes) that include corresponding pointers to the component file metadata structures associated with the large content file. A leaf node of the snapshot tree may be a file inode and store a pointer to a component file metadata structure associated with the large content file.

In some embodiments, the directory inode stores a first vector that indicates a size of the large content file data that is associated with a component file metadata structure. For example, the directory inode may store the vector {1, 10, . . . , 50}. This indicates that the first component file metadata structure is associated with 1 MB of the large content file, the second component file metadata structure is associated with 10 MB of the large content file, and the nth component file metadata structure is associated with 50 MB of the large content file.

In some embodiments, the size of the large content file data is the same for a plurality of sequential component file metadata structures associated with the large content file. For example, a large content file may be comprised of a first portion with a size of 1 MB, a second portion with a size of 10 MB, a third portion with a size of 10 MB, a fourth portion with a size of 10 MB, . . . , and an nth portion with a size of 50 MB. To reduce the amount of information stored by the leaf node, a run length encoding may be used. For example, instead of storing the vector {1, 10, 10, 10, . . . , 50}, the directory inode may be configured to store the vector {1, 10, . . . 50}. In the event run length encoding is used, the directory inode may be configured to store a second vector that indicates a number of sequential component file metadata structures with the same size. For example, the directory inode may store the vector {1, 3, . . . , 1}. This indicates that the component first metadata structure is associated with a content file portion size of 1 MB, the next three component file metadata structures are associated with a content file portion size of 10 MB, and the nth component file metadata structure is associated with a content file portion size of 50 MB.

When trying to perform a file system operation with respect to a large content file, a file system manager may use the information stored by the directory inode to perform the file system operation. The directory inode information may be used to access a particular offset of data of the large content file. For example, to access large content file data having an offset of 1-11 MB, the file system manager may inspect the directory inode of the snapshot tree associated with the large content file, determine that the second component file metadata structure of the large content file is associated with the file offset of 1-11 MB, and traverse the second component file metadata structure to access large content file data having a file offset of 1-11 MB.

In some embodiments, the snapshot tree is updated to reference a file metadata structure corresponding to with the content file. For example, a leaf node of the snapshot tree may be updated to reference a root node of the file metadata structure corresponding to the content file for a content file having a size that is not greater than the threshold size.

Figure 6B:
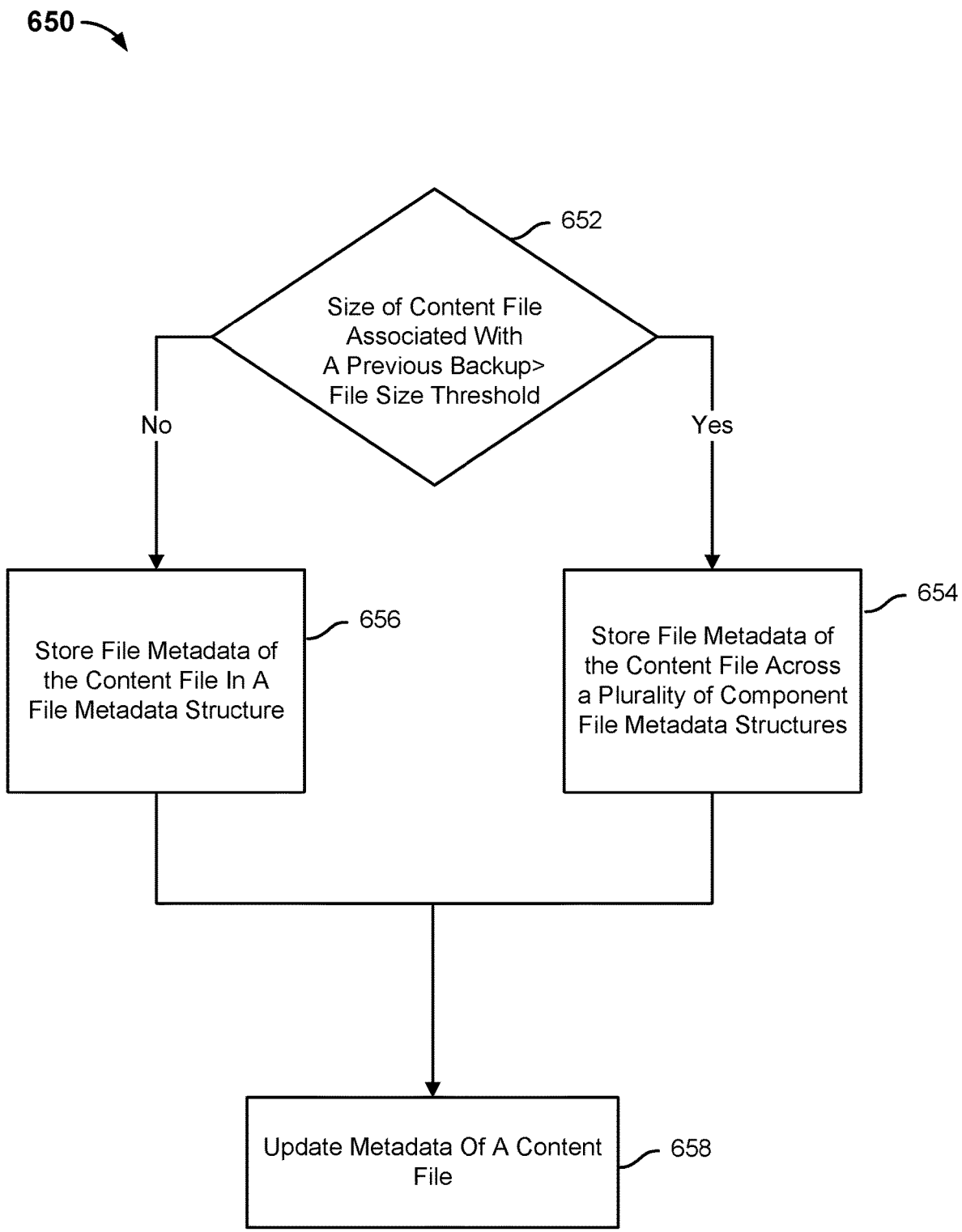
FIG. 6B is a flow chart illustrating an embodiment of a process for generating a view of file system data associated with a backup snapshot.

FIG. 6B is a flow chart illustrating an embodiment of a process for generating a view of file system data. In the example shown, process 650 may be implemented by a storage system, such as storage system 112. In some embodiments, process 650 is implemented to perform some or all of step 504 of process 500.

At 652, it is determined whether a size of a content file associated with a previous backup snapshot is greater than a threshold size.

A backup snapshot comprising file system data is received. The file system data includes a plurality of content files. At least one of the content files included in the backup snapshot may have been included in a previous backup snapshot. In some embodiments, the at least one content file is determined to be a large content file. The content file included in the previous backup snapshot may have been less than the threshold size at the time when the previous backup snapshot was performed, but has been modified such that the size of the content file included in the backup snapshot is greater than the threshold size, i.e., the content file was not previously a large content file, but is now a large content file. In some embodiments, the at least one content file is not determined to be a large content file. In the event it is determined that a size of a content file associated with a previous backup snapshot is greater than a threshold size, process 650 proceeds to 654. In the event it is determined that a size of a content file associated with a previous backup snapshot is not greater than a threshold size, process 650 proceeds to 656.

At 654, the file metadata of the content file is stored across a plurality of component file metadata structures. The metadata associated with the large content file that was stored prior to the content file becoming a large content file may remain in the previously generated file metadata structure. The metadata associated with the large content file after the content file become a large content file may be stored in one or more additional component file metadata structures. Each of the one or more additional component file metadata structures may be associated with a same size of the new portion of the large content file. For example, a previously stored file metadata structure may be associated with 64 GB of the content file. 64 GB may be the threshold size. Each of the one or more additional component file metadata structures may be associated with a pre-allocated size of the content file. For example, each of the one or more additional component file metadata structures may be associated with 16 GB of the large content file (e.g., a second component file metadata structure is associated with a file offset of 64 GB-80 GB of the large content file, a third component file metadata structure is associated with a file offset of 80 GB-96 GB of the large content file, etc.). In some embodiments, the one or more additional component file metadata structures are associated with different sizes of the new portion of the large content file.

A file metadata structure corresponding to a large content file may correspond to a particular amount of data associated with the content file. An additional component file metadata structure may be generated in the event the data associated with the content file exceeds the particular amount.

At 656, the file metadata of the content file is stored in a file metadata structure corresponding to the content file. The file metadata of the content file may be previously stored in a file metadata structure corresponding to the content file. The file metadata structure corresponding to the content file may be cloned (e.g., as described with respect to FIG. 3B) and the cloned metadata structure corresponding to the content file may be updated (e.g., as described with respect to FIG. 3C) based on the content file data included in the backup snapshot.

At 658, the metadata of a content file is updated. The metadata of a content file may be stored in a journal, a snapshot tree, a list, a data structure, etc. In some embodiments, the snapshot tree is updated to reference the plurality of component file metadata structures associated with the content file. The snapshot tree may updated to include a leaf node (e.g., directory inode) that is configured to store information that indicates which component file metadata structure is associated with which portion of the large content file. The directory inode may store corresponding pointers to each of the leaf nodes (e.g., file inodes) that include corresponding pointers to the component file metadata structures associated with the large content file. A leaf node of the snapshot tree may be a file inode and store a pointer to a component file metadata structure associated with the large content file.

In some embodiments, the directory inode may store a first vector that indicates a size of the large content file data that is associated with a component file metadata structure. For example, the directory inode may store the vector {64000, 16000, 16000}. This indicates that the first component file metadata structure is associated with 64 GB of the large content file, the second component file metadata structure is associated with 16 GB of the large content file, and the third component file metadata structure is associated with 16 GB of the large content file.

In some embodiments, the size of the large content file data is the same for a plurality of sequential component file metadata structures associated with the large content file. For example, a large content file may be comprised of a first portion with a size of 64 GB, a second portion with a size of 16 GB, and a third portion with a size of 16 GB. To reduce the amount of information stored by the leaf node, a run length encoding may be used. For example, instead of storing the vector {64000, 16000, 16000}, the directory inode may be configured to store the vector {64000, 16000}. In the event run length encoding is used, the directory inode may be configured to store a second vector that indicates a number of file metadata structures with the same size. For example, the directory inode may store the vector {1, 2}.

This indicates that the first component file metadata structure is associated with a content file portion size of 64 GB and the next two component file metadata structures are associated with a content file portion size of 16 GB.

In some embodiments, the snapshot tree is updated to reference a file metadata structure corresponding to with the content file. For example, a leaf node (e.g., file inode) of the snapshot tree may be updated to reference a root node of the file metadata structure corresponding to the content file for a content file having a size that is not greater than the threshold size, i.e., a leaf node of the snapshot tree may be updated to reference the modified cloned file metadata structure from step 656.

Figure 7:
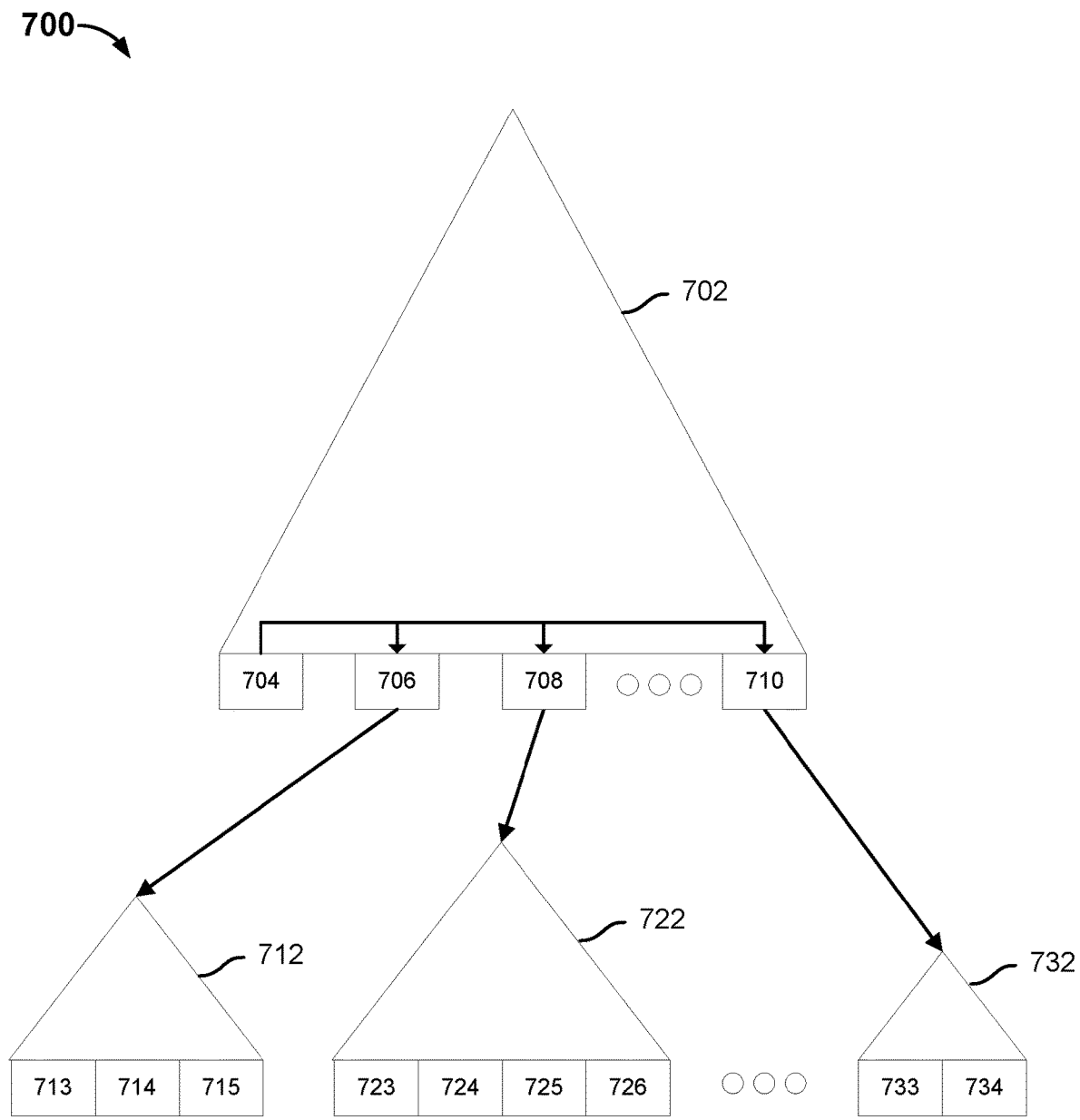
FIG. 7 is a block diagram illustrating an embodiment of a view of file system data.

FIG. 7 is a block diagram illustrating an embodiment of a view of file system data. A primary system may perform a backup snapshot (full or incremental) and send data associated with a content file to a storage system. The size of the content file may be larger than a threshold size and is considered to be a large content file. In the event a full backup snapshot is performed, all of the data associated with the large content file is backed up. In the event an incremental backup snapshot is performed, all of the data associated with the large content file may be backed up in the event the large content file was not previously stored on the primary system when the last backup snapshot was performed. The data associated with the large content file may be backed up in multiple portions. The different portions of the large content file may be backed up in portions of equal size. In other embodiments, the different portions of the large content file may be backed up in portions of different size. In other embodiments, some of the portions of the large content file have the same size and some portions of the large content file have a different size. File system data view 700 may be generated when a file system manager is performing step 604 of process 600 of FIG. 6A.

File system data view 700 includes snapshot tree 702 and component file metadata structures 712, 722, 732. Snapshot tree includes leaf nodes 704, 706, 708, 710. Snapshot tree 702 may include other leaf nodes that are not shown for explanation purposes.

Component file metadata structures 712, 722, 732 may correspond to different portions of a large content file. Leaf node 704 may be a directory inode and store information that indicates which component file metadata structure is associated with which portion of the large content file. Leaf node 704 may also store pointers to leaf nodes 706, 708, 710. Leaf nodes 706, 708, 710 may store respective pointers to component file metadata structures 712, 722, 732.

Component file metadata structure 712 may store the file metadata associated with a first portion of the large content file, component file metadata structure 722 may store the file metadata associated with a second portion of the large content file, and component file metadata structure 732 may store the file metadata associated with an nth portion of the large content file. Component file metadata structure 712 includes leaf nodes 713, 714, 715, which may store corresponding brick identifiers. Component file metadata structure 722 includes leaf nodes 723, 724, 725, 726, which may store corresponding brick identifiers. Component file metadata structure 732 includes leaf nodes 733, 734, which may store corresponding brick identifiers. A brick identifier may be used, as described above, to locate one or more data chunks associated with the large content file.

A leaf node of a file metadata structure may be configured to store an identifier of a data brick. A data brick may have a particular brick capacity (e.g., 256 kB). The brick capacity indicates a size of one or more data chunks to which the data brick may be associated. In some embodiments, a data brick is associated with a full capacity (e.g., 256 kB) of one or more data chunks. In some embodiments, a data brick is associated with less than a full capacity of one or more data chunks. The last portion of the plurality of portions associated with a large content file may not be brick aligned. A content file is brick aligned in the event the last brick of the component file metadata structure associated with the last portion of the content file, is at full capacity. A content file is not brick aligned in the event the last brick of the component file metadata structure associated with the last portion of the content file, is not at full capacity. In the event the last brick associated with a last portion of the content file is not brick aligned, the unused portion of the last brick may be reserved for the content file such that the last brick does not store information that corresponds to one or more data chunks associated with a different content file.

For example, the data brick associated with leaf node 734 may be associated with 150 kB of data chunks. The size of the data brick may 256 kB. 100 kB of the data brick associated with leaf node 734 is not associated with any data chunks. Instead of using the 100 kB of the data brick associated with leaf node 734 for one or more data chunks associated with a second content file, the last 100 kB of the data brick associated with leaf node 734 may be reserved for the first content file. The one or more data chunks associated with the second content file may be associated with one or more other data bricks that are separate from the data bricks associated with the first content file, that is, in some embodiments, the data brick associated with leaf node 734 is not configured to be associated with multiple content files. For example, a content file may have a size of 7.9 MB. The last brick of the file metadata structure corresponding to the content file may be associated with a file offset of 7.7-7.9 MB. Instead of a first data brick associated with a second file having a starting file offset at 7.9 MB, the file offset associated with the last data brick may be extended from 7.9 MB to 8.0 MB (e.g., the last 100 kB is reserved for the first content file) such that the first data brick associated with the second file has a starting file offset of 8.0 MB, i.e., the file offsets associated with a content file are brick aligned.

Figure 8:
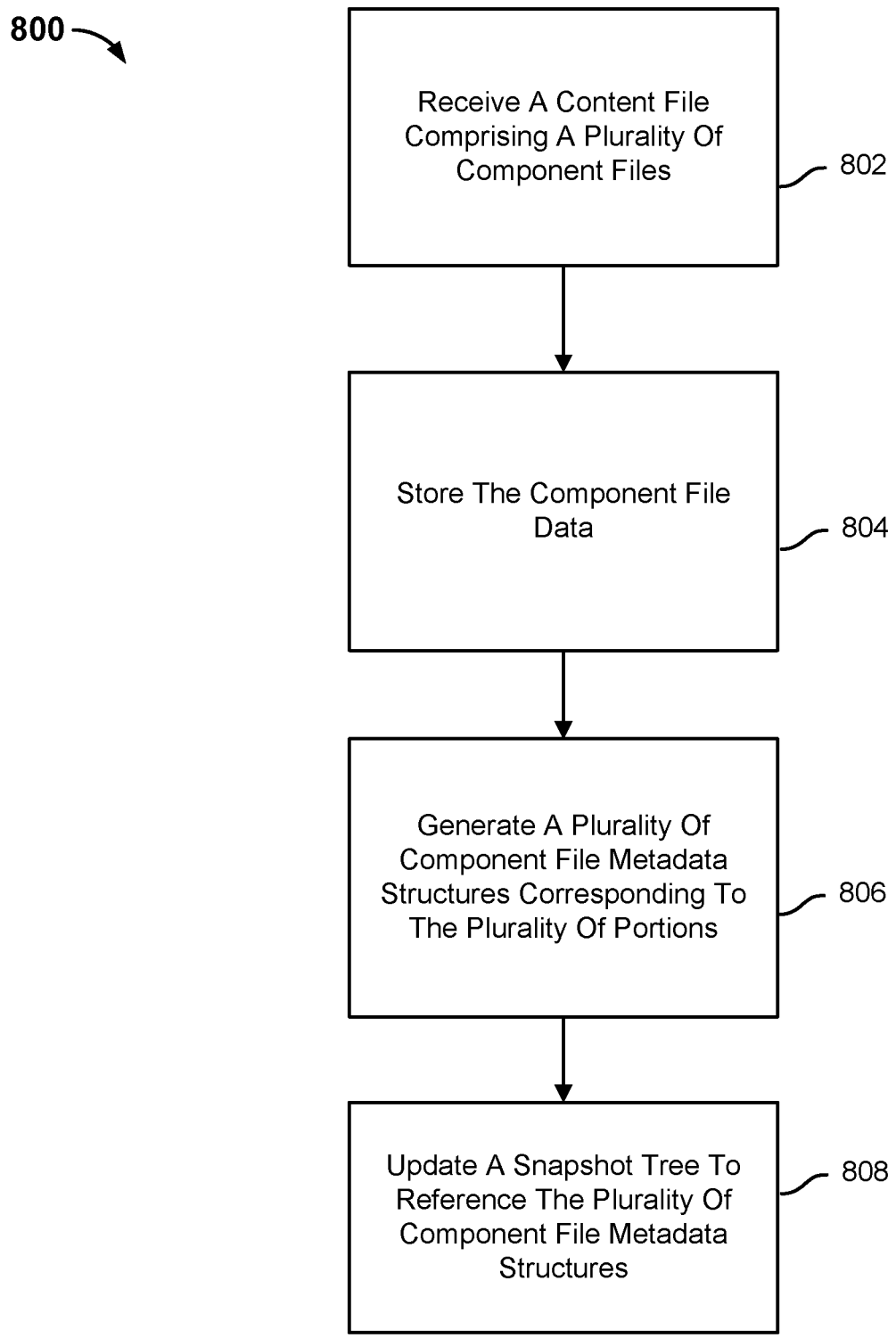
FIG. 8 is a flow chart illustrating an embodiment of a process for performing a backup of a large content file.

FIG. 8 is a flow chart illustrating an embodiment of a process for performing a backup of a large content file. In the example, shown, process 800 may be implemented by a storage system, such as storage system 112.

At 802, a content file comprising a plurality of component files is received. The content file may be a large content file. In some embodiments, the plurality of component files have different sizes. In some embodiments, the plurality of component files have the same size. In some embodiments, some of the plurality of component files have different sizes and some of the plurality of component files have the same size. A first component file may correspond to a first portion of the content file, a second component file may correspond to a second portion of the content file, . . . , and an nth component file may correspond to an nth portion of the content file.

At 804, the component file data is stored. The component file may be comprised of a plurality of data chunks. The data chunks may be stored in one or more chunk files. Each component file may be associated with one or more chunk files. The one or more chunk files may be stored in a storage of a storage system, such as a hard disk drive or a solid state drive.

At 806, a plurality of component file metadata structures corresponding to the plurality of portions are generated. Each component file metadata structure is configured to store the file metadata associated with a corresponding portion of the content file. For example, a first component file metadata structure is configured to store the file metadata associated with a first portion of the content file, a second component file metadata structure is configured to store the file metadata associated with a second portion of the content file, . . . , and an nth component file metadata structure is configured to store the file metadata associated with an nth portion of the content file.

A leaf node of a file metadata structure may be configured to store an identifier of a data brick. A data brick may have a particular brick capacity (e.g., 256 kB). The brick capacity indicates a size of one or more data chunks to which the data brick may be associated. In some embodiments, a data brick is associated with a full capacity (e.g., 256 kB) of one or more data chunks. In some embodiments, a data brick is associated with less than a full capacity of one or more data chunks. The last portion of the plurality of portions associated with a large content file may not be brick aligned. A content file is brick aligned in the event the last brick of the component file metadata structure associated with the last portion of the content file, is at full capacity. A content file is not brick aligned in the event the last brick of the component file metadata structure associated with the last portion of the content file, is not at full capacity. In the event the last brick associated with a last portion of the content file is not brick aligned, the unused portion of the last brick may be reserved for the content file such that the last brick does not store information that corresponds to one or more data chunks associated with a different content file. For example, the last data brick of the last portion of a first content file may be associated with 150 kB of data chunks. The size of the data brick may 256 kB. 100 kB of the last data brick is not associated with any data chunks. Instead of using the 100 kB of the last data brick for one or more data chunks associated with a second content file, the last 100 kB of the last data brick may be reserved for the first content file. The one or more data chunks associated with the second content file may be associated with one or more other data bricks that are separate from the data bricks associated with the first content file, that is, in some embodiments, a data brick is not configured to be associated with multiple content files. For example, a content file may have a size of 7.9 MB. The last brick of the file metadata structure corresponding to the content file may be associated with a file offset of 7.7-7.9 MB. Instead of a first data brick associated with a second file having a starting file offset at 7.9 MB, the file offset associated with the last data brick may be extended from 7.9 MB to 8.0 MB (e.g., the last 100 kB is reserved for the first content file) such that the first data brick associated with the second file has a starting file offset of 8.0 MB, i.e., the file offsets associated with a content file are brick aligned.

At 808, a snapshot tree is updated to reference the plurality of component file metadata structures for the content file. Leaf nodes of a snapshot tree are generated for the plurality of component file metadata structures associated with the content file. A first leaf node may be generated to store information that indicates which component file metadata structure is associated with which portion of the large content file. Two or more leaf nodes may be generated to store corresponding pointers to one of the component file metadata structures associated with the large content file. The first leaf node may include pointers to the leaf nodes that store pointers to the component file metadata structures associated with the large content file.

The first leaf node may track different sizes of portions of the content file stored in different component files of the plurality of component files. For example, the first leaf node may store a first vector that indicates a size of the large content file data that is associated with a component file metadata structure. For example, the first leaf node may store the vector {1, 10, . . . , 50}. This indicates that the first component file metadata structure is associated with a first component file with a size of 1 MB, the second component file metadata structure is associated with a second component file with a size of 10 MB, . . . , and the nth component file metadata structure is associated with an nth component file with a size of 50 MB.

In some embodiments, the size of the large content file data is the same for a plurality of sequential component file metadata structures associated with the large content file. For example, a large content file may be comprised of a first portion with a size of 1 MB, a second portion with a size of 10 MB, a third portion with a size of 10 MB, a fourth portion with a size of 10 MB, . . . , and an nth portion with a size of 50 MB. To reduce the amount of information stored by the first leaf node, a run length encoding may be used. For example, instead of storing the vector {1, 10, 10, 10, . . . , 50}, the first leaf node may be configured to store the vector {1, 10, . . . , 50}. In the event run length encoding is used, the first leaf node may be configured to store a second vector that indicates a number of sequential component file metadata structures with the same size. For example, the first leaf node may store the vector {1, 3, . . . , 1}. This indicates that the component first metadata structure is associated with a content file portion size of 1 MB, the next three component file metadata structures are associated with a content file portion size of 10 MB, and the nth component file metadata structure is associated with a content file portion size of 50 MB.

Figure 9A:
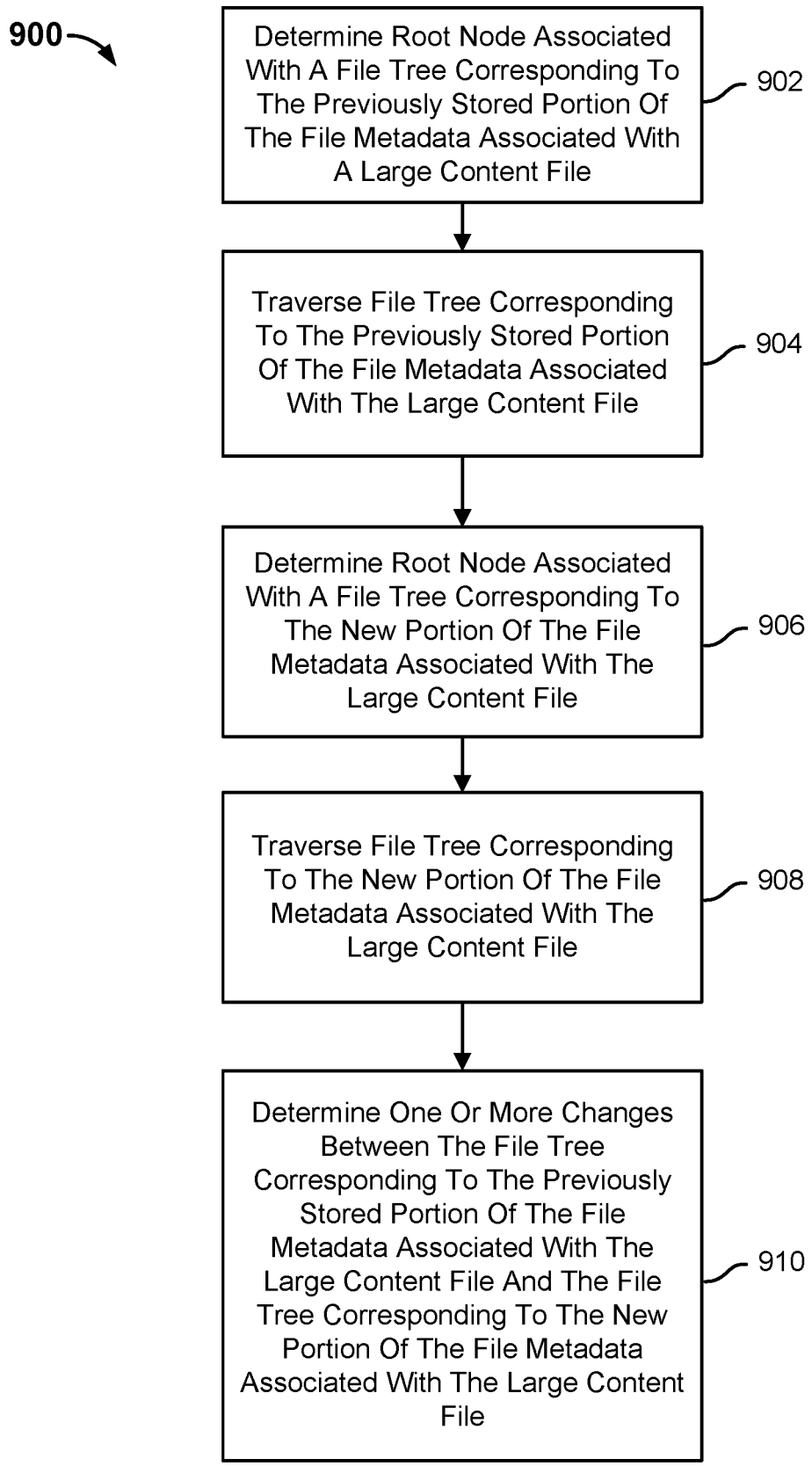
FIG. 9A is a flow chart illustrating an embodiment of a process for determining differences between a non-large version of a content file and a large version of the content file.

FIG. 9A is a flow chart illustrating an embodiment of a process for determining differences between a non-large version of a content file and a large version of the content file, which is to say differences between a content file that is smaller than or equal to a threshold size, and a content file that is larger than the threshold size. In the example shown, process 900 may be implemented by a storage system, such as storage system 112.

In some embodiments, the differences between a non-large version of a content file and a large version of the content file are determined for malicious software detection purposes. At some point in time, a content file may become infected with malicious software. The different versions of the content file may be analyzed to determine a clean version of the content file, i.e., a version that is not infected with malicious software. The differences between a non-large version of the content file and the large version of the content file may identify portions of the content file that are not included in the non-large version of the content file. The identified portions of the content file that are not included in the non-large version of the content file may be analyzed to determine if they are infected with malicious software. In the event those portions are infected with malicious software, the non-large version of the content file may be determined to be a clean version of the content file.

In some embodiments, the differences between a non-large version of a content file and a large version of the content file are determined for analysis purposes. A content file may correspond to an application. At some point in time, a content file may begin to experience problems (e.g., software error). The different versions of the content file may be analyzed to determine a source of the problems. The differences between a non-large version of the content file and the large version of the content file may identify portions of the content file that are not included in the non-large version of the content file. The identified portions of the content file that are not included in the non-large version of the content file may be analyzed to determine if they are the source of the application problems. In the event those portions are the source of the application problems, the non-large version of the content file may be determined to be a version of the content file that does not include the problems. In some embodiments, differences between a non-large version of a content file and a large version of the content file are used for replication purposes.

A content file may store a particular amount of data. The content file may have a corresponding file metadata structure that is configured to store the metadata associated with the content file. When the size of the content file becomes larger than a threshold size, the metadata associated with the large content file may be stored across a plurality of file metadata structures.

The size of the content file may increase over time as a storage system receives one or more backup snapshots from a primary system. For example, the primary system may perform a backup snapshot that includes data associated with a content file. The size of the data associated with the content file may be less than or equal to the threshold size for a large content file. A file metadata structure corresponding to the content file may be generated by the storage system. The primary system may perform a subsequent incremental backup snapshot that includes data associated with the content file that was not previously backed up. The size of the data associated with the content file may become greater than the threshold size for a large content file. A second file metadata structure corresponding to the content file may be generated. The second file metadata structure may include metadata associated the portion of the content file that backed up in the subsequent incremental backup snapshot.

At 902, a root node associated with a file metadata structure corresponding to the previously stored portion of the file metadata associated with a large content file is determined. For example, file metadata structure 412, as depicted in FIG. 4B, corresponds to a file metadata structure corresponding to the previously stored portion of the file metadata associated with a large content file. The file metadata structure corresponding to the previously stored portion of the file metadata associated with a large content file may correspond to a version of the content file that is less than or equal to the threshold size. The file metadata structure corresponding to the previously stored portion of the file metadata associated with a large content file has an associated "TreeID." The root node associated with a file metadata structure corresponding to the previously stored portion of the file metadata associated with a large content file may be determined based on the "TreeID."

At 904, the file metadata structure corresponding to the previously stored portion of the file metadata associated with a large content file is traversed from the root node determined in 902 to each node of the file metadata structure corresponding to the previously stored portion of the file metadata associated with a large content file. The leaf nodes associated with a file metadata structure may be identified.

For example, file metadata structure 412 may be traversed from its corresponding root node to each of the leaf nodes 421, 422, 423, 424, 425, 426, 427, 428. Leaf nodes 421, 422, 423, 424, 425, 426, 427, 428 may be identified as being associated with file metadata structure 412.

At 906, a root node associated with a file metadata structure corresponding to the new portion of the file metadata associated with a large content file is determined. For example, file metadata structure 462, as depicted in FIG. 4B, corresponds to a file metadata structure corresponding to the new portion of the file metadata associated with a large content file. The file metadata structure corresponding to the new portion of the file metadata associated with a large content file may correspond to a version of the content file that is greater than the threshold size. The file metadata structure corresponding to the new portion of the file metadata associated with a large content file has an associated "TreeID." The root node associated with a file metadata structure corresponding to the new portion of the file metadata associated with a large content file may be determined based on the associated "TreeID."

At 908, the file metadata structure corresponding to the new portion of the file metadata associated with a large content file is traversed from the root node determined in 906 to each node of the file metadata structure corresponding to the new portion of the file metadata associated with a large content file. The leaf nodes associated with a file metadata structure may be identified.

For example, file metadata structure 462 may be traversed from its corresponding root node to each of the leaf nodes 471, 472, 473, 474. Leaf nodes 471, 472, 473, 474 may be identified as being associated with file metadata structure 462.

At 910, one or more changes between the file metadata structure corresponding to the previously stored portion of the file metadata associated with a large content file and the file metadata structure corresponding to the new portion of the file metadata associated with a large content file are determined. The portion of the large content file that is associated with data before the content file became a large content file may have a "TreeID" associated with file metadata structure corresponding to the previously stored portion of the file metadata associated with a large content file. The portion of the large content file that is associated with data after the content file became a large content file may have a "TreeID" associated with file metadata structure corresponding to the new portion of the file metadata associated with a large content file. For example, a file metadata structure corresponding to the previously stored portion of the file metadata associated with a large content file (e.g., file metadata structure 412 as depicted in FIG. 4B) may have a "TreeID" of "1" and a file metadata structure corresponding to the new portion of the file metadata associated with a large content file (e.g., file metadata structure 462 as depicted in FIG. 4B) may have a "TreeID" of "3." In the event a node of a file metadata structure has a "TreeID" of "1," the node is determined to be associated with the file metadata structure corresponding to the previously stored portion of the file metadata associated with a large content file. In the event a node of a file metadata structure has a "TreeID" of "3," the node is determined to be associated with the file metadata structure corresponding to the new portion of the file metadata associated with a large content file.

The differences between the file metadata structure corresponding to the previously stored portion of the file metadata associated with a large content file and the file metadata structure corresponding to the new portion of the file metadata associated with a large content file may also be determined based on the leaf nodes identified in steps 904, 908. The leaf nodes identified in steps 904, 908 may be compared to determine the differences between file metadata structures. For example, leaf nodes 421, 422, 423, 424, 425, 426, 427, 428 were identified as being associated with file metadata structure 412 and leaf nodes 471, 472, 473, 474 were identified as being associated with file metadata structure 462. The differences may be determined based on comparing the leaf nodes that were identified in steps 904, 908.

Figure 9B:
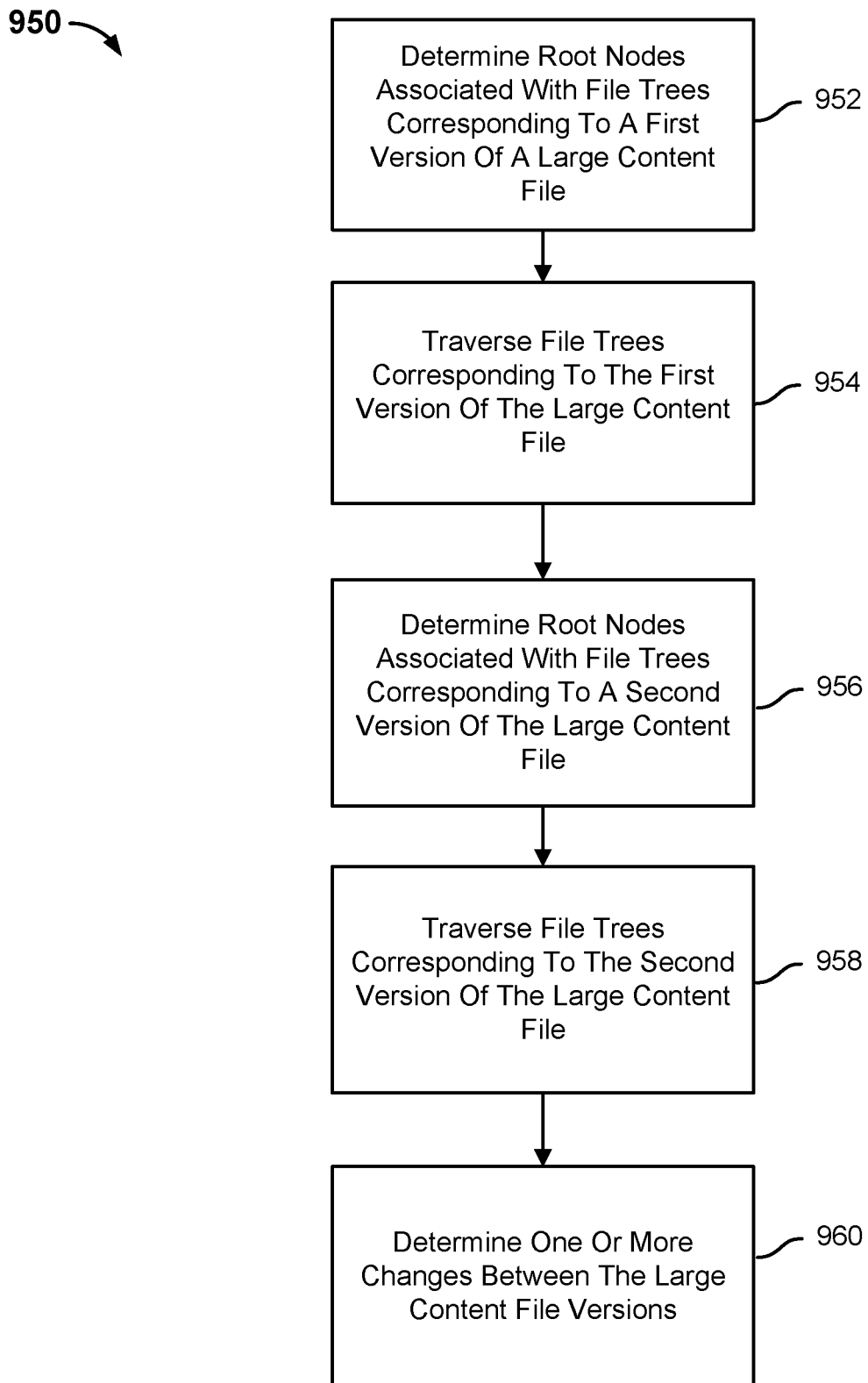
FIG. 9B is a flow chart illustrating an embodiment of a process for determining differences between different large versions of a content file.

FIG. 9B is a flow chart illustrating an embodiment of a process for determining differences between different large versions of a content file. In the example shown, process 900 may be implemented by a storage system, such as storage system 112.

In some embodiments, the differences between large versions of a content file are determined for malicious software detection purposes. At some point in time, a content file may become infected with malicious software. The different versions of the content file may be analyzed to determine a clean version of the content file, i.e., a version that is not infected with malicious software. The differences between the large versions of the content file may identify portions of the content file that were added between versions. The identified portions of the content file that are not included in a first version of the large content file (e.g., the portion that was added in the second version of the large content file) may be analyzed to determine if they are infected with malicious software. In the event those portions are infected with malicious software, the first large version of the content file may be determined to be a clean version of the content file.

In some embodiments, the differences between large versions of a content file are determined for analysis purposes. A content file may correspond to an application. At some point in time, a content file may begin to experience problems (e.g., software error). The different versions of the content file may be analyzed to determine a source of the problems. The differences between large versions of the content file may identify portions of the content file that are not included in the first version of the content file (e.g., the portion that was added in the second version of the large content file). The identified portions of the content file that are not included in the first large version of the content file may be analyzed to determine if they are the source of the application problems. In the event those portions are the source of the application problems, the first large version of the content file may be determined to be a version of the content file that does not include the problems.

At 952, root nodes associated file metadata structures corresponding to a first version of a large content file are determined. A first version of a large content file may be associated with a plurality of file metadata structures. For example, the first version of a large content file may be associated with file metadata structures 412, 462 as depicted in FIG. 4C. File metadata structures 412, 462 have corresponding a "TreeID." The root node associated with file metadata structure 412 and the root node associated with file metadata structure 462 may be determined.

At 954, the file metadata structures corresponding to a first version of a large content file are traversed. A file metadata structure may be traversed from a root node associated with the file metadata structure to each of the leaf nodes associated with the file metadata structure. The leaf nodes associated with a file metadata structure may be identified.

For example, file metadata structure 412 may be traversed from its corresponding root node to each of the leaf nodes 421, 422, 423, 424, 425, 426, 427, 428. File metadata structure 462 may be traversed from its corresponding root node to each of the leaf nodes 471, 472, 473, 474. Leaf nodes 421, 422, 423, 424, 425, 426, 427, 428 may be identified as being associated with file metadata structure 412. Leaf nodes 471, 472, 473, 474 may be identified as being associated with file metadata structure 462.

At 956, root nodes associated file metadata structures corresponding to a second version of a large content file are determined. A second version of a large content file may be associated with a plurality of file metadata structures. For example, the second version of a large content file may be associated with file metadata structures 492, 494 as depicted in FIG. 4C. File metadata structures 492, 494 have corresponding a "TreeID." The root node associated with file metadata structure 492 and the root node associated with file metadata structure 494 may be determined. The second version of a large content file may corresponding to a modified version of a first version of the content file.

At 958, the file metadata structures corresponding to a second version of a large content file are traversed. A file metadata structure may be traversed from a root node associated with the file metadata structure to each of the leaf nodes associated with the file metadata structure. The leaf nodes associated with a file metadata structure may be identified.

For example, file metadata structure 492 may be traversed from its corresponding root node to each of the leaf nodes 422, 423, 424, 425, 426, 427, 428, 491. File metadata structure 494 may be traversed from its corresponding root node to each of the leaf nodes 472, 473, 474, 493. Leaf nodes 422, 423, 424, 425, 426, 427, 428, 491 may be identified as being associated with file metadata structure 492. Leaf nodes 472, 473, 474, 493 may be identified as being associated with file metadata structure 494.

At 960, one or more changes between the large content file versions are determined. The file metadata structures that share nodes may be compared to each other to determine changes between portions of the large content file. For example, file metadata structure 492 may be compared to file metadata structure 412 and file metadata structure 494 may be compared to file metadata structure 462.

The differences between file metadata structures that share nodes may be determined based on the "TreeID" associated with each file metadata structure. Each node of a file metadata structure has an associated "TreeID." In the event a leaf node has a "TreeID" that matches the "TreeID" of the root node of the file metadata structure, then the leaf node may be determined to be associated with that particular file metadata structure. For example, leaf node 491 has a "TreeID" that matches the "TreeID" of the root node of file metadata structure 492. The data associated with leaf node 491 is one difference between the first and second versions of the large content file. Leaf node 493 has a "TreeID" that matches the "TreeID" of the root node of file metadata structure 494. The data associated with leaf node 493 is another difference between the first and second versions of the large content file.

The differences between file metadata structures that share nodes may also be determined based on the leaf nodes identified in steps 954, 958. The leaf nodes identified in steps 954, 958 may be compared to determine the differences between file metadata structures.

For example, leaf nodes 421, 422, 423, 424, 425, 426, 427, 428 were identified as being associated with file metadata structure 412 and leaf nodes 422, 423, 424, 425, 426, 427, 428, 491 were identified as being associated with file metadata structure 492. The difference between file metadata structures 412, 492 are leaf nodes 421, 492. These leaf nodes may be identified based on comparing the leaf nodes that were identified in steps 954, 958.

Leaf nodes 471, 472, 473, 474 were identified as being associated with file metadata structure 462 and leaf nodes 472, 473, 474, 493 were identified as being associated with file metadata structure 494. The difference between file metadata structures 462, 494 are leaf nodes 471, 493. These leaf nodes may be identified based on comparing the leaf nodes that were identified in steps 954, 958.

Figure 10:
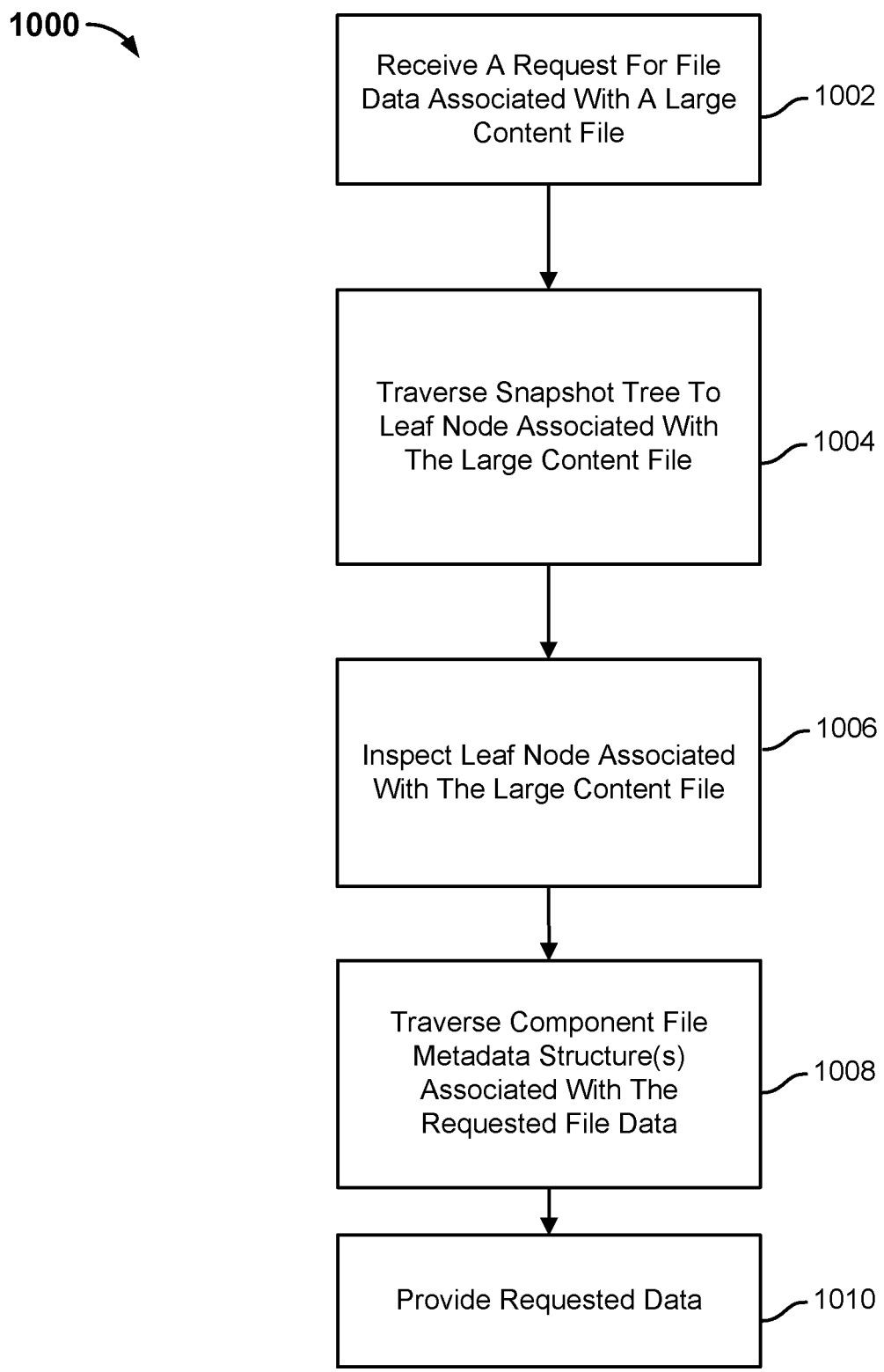
FIG. 10 is a flow chart illustrating a process for providing data associated with a large content file.

FIG. 10 is a flow chart illustrating a process for providing data associated with a large content file. In the example shown, process 1000 may be implemented by a file system manager, such as file system manager 115.

At 1002, a request for file data associated with a large content file is received. A client device, such as a primary system, may request for file data associated with a large content file that is stored on a storage system. The file data request may include a file offset ranges associated with the large content file. For example, a request for data with a file offset of 1 GB-2 GB of file data may be received.

At 1004, a snapshot tree is traversed to a leaf node associated with the large content file. A snapshot tree may include a leaf node that corresponds to the large content file. The file metadata associated with the large content file may be stored across a plurality of component file metadata structures.

At 1006, the leaf node associated with the large content file is inspected. The leaf node (e.g., directory inode) may store information that indicates which component file metadata structure is associated with which portion of the large content file. The leaf node may be inspected to identify the one or more component file metadata structures associated with the file data request.

In some embodiments, the leaf node may store a first vector that indicates a size of the large content file data that is associated with a component file metadata structure. For example, the leaf node may store the vector {1, 10, ..., 50}.

In some embodiments, the size of the large content file data is the same for a plurality of sequential component file metadata structures associated with the large content file. For example, a large content file may be comprised of a first part with a size of 1 MB, a second part with a size of 10 MB, a third part with a size of 10 MB, a third part with a size of 10 MB, ..., and an nth part with a size of 50 MB. The leaf node may store a second vector that indicates a number of component file metadata structures with the same size. For example, the leaf node may store the vector {1, 3, ..., 1}.

The leaf node may store corresponding pointers to each of the leaf nodes (e.g., file inodes) that include corresponding pointers to the component file metadata structures associated with the large content file. The leaf node may be traversed to each of the leaf nodes that include corresponding pointers to the component file metadata structures associated with the large content file.

At 1008, one or more component file metadata structures associated with the requested file data are traversed. The requested file data associated with the large content file has an associated file offset range. The one or more component file metadata structures corresponding to the file offset range are traversed.

At 1010, the requested data is provided. A component file metadata structure includes a plurality of leaf nodes that store corresponding brick identifiers. A brick identifier may be used, as described above, to locate the one or more data chunks associated with the brick identifier. The data chunks associated with each of the brick identifiers associated with the requested file data may be located and provided.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
 determining that a size associated with a content file is greater than a threshold size;
 storing contents of the content file split across a plurality of component files, wherein a component file of the component files is configured to store a portion of the contents of the content file;
 generating a plurality of component file metadata structures for the plurality of component files of the content file, wherein a component file metadata structure of the plurality of component file metadata structures corresponds to one of the plurality of component files of the content file, wherein each of the plurality of component file metadata structures includes a corresponding root node; and
 updating metadata, for the content file, to reference the plurality of component file metadata structures for the plurality of component files, wherein a node of the metadata is configured to track different sizes of portions of the content file stored in different component files of the plurality of component files, wherein file metadata of the content file is split across the plurality of component file metadata structures and each component file metadata structure of the plurality of component file metadata structures specifies a corresponding structure organizing data components for a corresponding portion of the content file.

2. The method of claim 1, wherein the node stores information, wherein the information includes a first vector that indicates corresponding size information associated with each of the plurality of component file metadata structures.

3. The method of claim 2, wherein the information includes a second vector that indicates a number of sequential component file metadata structures having a corresponding size indicated by the first vector.

4. The method of claim 3, wherein at least two sequential component file metadata structures are associated with a same portion size of the content file.

5. The method of claim 1, further comprising receiving a request for file data associated with the content file.

6. The method of claim 5, further comprising inspecting the node to identify the plurality of component file metadata structures associated with the content file.

7. The method of claim 6, further comprising:
traversing the plurality of identified component file metadata structures associated with the content file; and
providing the requested file data associated with the content file.

8. The method of claim 1, further comprising receiving the plurality of component files.

9. The method of claim 8, wherein at least two of the plurality of component files have a same size.

10. The method of claim 8, wherein at least two of the plurality of component files have a different size.

11. The method of claim 8, further comprising generating the plurality of component file metadata structures for the plurality of component files.

12. The method of claim 1, wherein file offsets associated with the content file are brick aligned.

13. The method of claim 1, wherein the node is a directory inode.

14. The method of claim 1, wherein the node includes pointers to two or more other nodes, wherein the two or more other nodes include corresponding pointers to the plurality of component file metadata structures associated with the content file.

15. A computer program product, the computer program product being embodied in a non-transitory computer readable storage medium and comprising computer instructions for:
determining that a size associated with a content file is greater than a threshold size;
storing contents of the content file split across a plurality of component files, wherein a component file of the component files is configured to store a portion of the contents of the content file;
generating a plurality of component file metadata structures for the plurality of component files of the content file, wherein a component file metadata structure of the plurality of component file metadata structures corresponds to one of the plurality of component files of the content file, wherein each of the plurality of component file metadata structures includes a corresponding root node; and
updating metadata, for the content file, to reference the plurality of component file metadata structures for the plurality of component files, wherein a node of the metadata is configured to track different sizes of portions of the content file stored in different component files of the plurality of component files, wherein file metadata of the content file is split across the plurality of component file metadata structures and each component file metadata structure of the plurality of component file metadata structures specifies a corresponding structure organizing data components for a corresponding portion of the content file.

16. The computer program product of claim 15, wherein the node stores information, wherein the information includes a first vector that indicates corresponding size information associated with each of the plurality of component file metadata structures.

17. The computer program product of claim 16, wherein the information includes a second vector that indicates a number of sequential component file metadata structures having a corresponding size indicated by the first vector.

18. A system, comprising:
a processor configured to:
determine that a size associated with a content file is greater than a threshold size;
store contents of the content file split across a plurality of component files, wherein a component file of the component files is configured to store a portion of the contents of the content file;
generate a plurality of component file metadata structures for the plurality of component files of the content file, wherein a component file metadata structure of the plurality of component file metadata structures corresponds to one of the plurality of component files of the content file, wherein each of the plurality of component file metadata structures includes a corresponding root node; and
update metadata, for the content file, to reference the plurality of component file metadata structures for the plurality of component files, wherein a node of the metadata is configured to track different sizes of portions of the content file stored in different component files of the plurality of component files, wherein file metadata of the content file is split across the plurality of component file metadata structures and each component file metadata structure of the plurality of component file metadata structures specifies a corresponding structure organizing data components for a corresponding portion of the content file; and
a memory coupled to the processor and configured to provide the processor with instructions.

19. The method of claim 1, wherein the node of the metadata is configured to store information that indicates which component file metadata structure of the plurality of component file metadata structures is associated with which component file of the plurality of component files.

* * * * *

UNITED STATES PATENT AND TRADEMARK OFFICE
CERTIFICATE OF CORRECTION

PATENT NO. : 11,074,135 B2
APPLICATION NO. : 16/688653
DATED : July 27, 2021
INVENTOR(S) : Aron et al.

It is certified that error appears in the above-identified patent and that said Letters Patent is hereby corrected as shown below:

In the Specification

In Column 24, Line(s) 46, after "time", insert --$t_1$,--.
In Column 32, Line(s) 62 & 63, delete "{1, 10, . . . 50}" and insert --{1, 10, . . . , 50}--, therefor.
In Column 34, Line(s) 33, after "may", insert --be--.

Signed and Sealed this
Thirtieth Day of August, 2022

*Katherine Kelly Vidal*
Katherine Kelly Vidal
*Director of the United States Patent and Trademark Office*